United States Patent
Shulman et al.

(10) Patent No.: US 10,020,941 B2
(45) Date of Patent: Jul. 10, 2018

(54) VIRTUAL ENCRYPTION PATCHING USING MULTIPLE TRANSPORT LAYER SECURITY IMPLEMENTATIONS

(71) Applicant: Imperva, Inc., Redwood City, CA (US)

(72) Inventors: Amichai Shulman, Tel Aviv (IL); Itsik Mantin, Shoham (IL); Nadav Avital, Pardes Hana Karkur (IL); Offir Zigelman, Kiryat Ata (IL); Oren Brezner, Rishon le Zion (IL); Dmitry Babich, Ramat Gan (IL)

(73) Assignee: Imperva, Inc., Redwood City, CA (US)

( * ) Notice: Subject to any disclaimer, the term of this patent is extended or adjusted under 35 U.S.C. 154(b) by 359 days.

(21) Appl. No.: 14/944,151

(22) Filed: Nov. 17, 2015

(65) Prior Publication Data
US 2017/0093824 A1 Mar. 30, 2017

Related U.S. Application Data

(60) Provisional application No. 62/235,504, filed on Sep. 30, 2015.

(51) Int. Cl.
*H04L 9/30* (2006.01)
*H04L 9/32* (2006.01)
*H04L 29/06* (2006.01)

(52) U.S. Cl.
CPC .......... *H04L 9/30* (2013.01); *H04L 9/32* (2013.01); *H04L 63/0281* (2013.01); *H04L 63/1433* (2013.01); *H04L 63/164* (2013.01)

(58) Field of Classification Search
CPC ......... H04L 9/32; H04L 9/30; H04L 63/0281; H04L 63/1433; H04L 63/164
See application file for complete search history.

(56) References Cited

U.S. PATENT DOCUMENTS

| | | | |
|---|---|---|---|
| 9,680,869 B2 * | 6/2017 | Buruganahalli | H04L 63/166 |
| 2004/0193918 A1 * | 9/2004 | Green | H04L 63/1433 726/22 |
| 2005/0273849 A1 * | 12/2005 | Araujo | H04L 63/0281 726/12 |

(Continued)

OTHER PUBLICATIONS

Phillips, "TLSFilter: An Application-Level Firewall for Transport Layer Security", 2014, pp. 1-88. https://www.doc.ic.ac.uk/teaching/distinguished-projects/2014/m.phillips.pdf (Year: 2014).*

(Continued)

*Primary Examiner* — Izunna Okeke
*Assistant Examiner* — Hee K Song
(74) *Attorney, Agent, or Firm* — Nicholson De Vos Webster & Elliott LLP

(57) ABSTRACT

Techniques related to virtual encryption patching are described. A security gateway includes multiple Transport Layer Security Implementations (TLSI) that can be used for creating secure communications channels to carry application-layer traffic between one or more clients and one or more server applications. In some embodiments, upon determining that one of the multiple TLSIs contains a security vulnerability, that TLSI can be disabled, leaving one or more others of the multiple TLSIs enabled and available to be used to carry traffic of new connections between the clients and server applications.

42 Claims, 11 Drawing Sheets

(56) References Cited

U.S. PATENT DOCUMENTS

| | | | | |
|---|---|---|---|---|
| 2012/0030750 | A1* | 2/2012 | Bhargava | H04L 63/02 726/13 |
| 2012/0054729 | A1* | 3/2012 | Sobel | G06F 8/65 717/169 |
| 2013/0276068 | A1* | 10/2013 | Alwar | G06F 21/53 726/4 |
| 2014/0304498 | A1* | 10/2014 | Gonuguntla | H04L 63/168 713/151 |
| 2014/0337614 | A1* | 11/2014 | Kelson | H04L 63/168 713/152 |
| 2014/0359749 | A1* | 12/2014 | Rieke | H04L 63/02 726/11 |
| 2015/0113264 | A1* | 4/2015 | Wang | H04L 63/0823 713/151 |
| 2015/0237063 | A1* | 8/2015 | Cotton | H04L 63/1433 726/25 |
| 2016/0119374 | A1* | 4/2016 | Williams | H04L 63/1441 713/175 |
| 2017/0034204 | A1* | 2/2017 | El-Moussa | G06F 21/577 |
| 2017/0061129 | A1* | 3/2017 | Bektchiev | H04L 9/00 |
| 2017/0093984 | A1* | 3/2017 | Dhanabalan | H04L 67/141 |
| 2017/0324781 | A1* | 11/2017 | Hu | H04L 63/205 |

OTHER PUBLICATIONS

Mehnert et al., "Not-quite-so-broken TLS: lessons in re-engineering a security protocol specification and implementation", Aug. 2015, pp. 223-238. 24th USENIX Security Symposium (Year: 2015).*

Chen et al., "PoLUS: A POwerful Live Updating System", 2007, pp. 1-10, 29th International Conference on Software Engineering (ICSE'07) (Year: 2007).*

"Issue 28744: Use SSLClientSocketNSS on Windows," Nov. 24, 2009, 8 pages, chromium—an open-source project to help move the web forward, downloaded from https://code.google.com/p/chromium/issues/detail?id=28744 on Jun. 11, 2015.

"What's the need of multiple implementations of SSL/TLS? [closed]," Jun. 1, 2014, 3 pages, Information Security Stack Exchange, downloaded from https://security.stackexchange.com/questions/59146/whats-the-need-of-multiple-implementations-of-ssl-tls on Jun. 11, 2015.

Chris Conlon, "Installing an Alternate SSL Provider on Android," Jul. 31, 2011, 3 pages, Linux Journal, downloaded from http://www.linuxjournal.com/article/10896.

C. Michael Chernick et al., "NIST Special Publication 800-52, Guidelines for the Selection and Use of Transport Layer Security (TLS) Implementations," Jun. 2005, 33 pages, National Institute of Standards and Technology, Technology Administration, U.S. Department of Commerce, downloaded from http://csrc.nist.gov/publications/nistpubs/800-52/SP800-52.pdf.

Tim Polk et al., "NIST Special Publication 800-52, Revision 1, Guidelines for the Selection, Configuration, and Use of Transport Layer Security (TLS) Implementations," Apr. 2014, 67 pages, National Institute of Standards and Technology, U.S. Department of Commerce, downloaded from http://nvlpubs.nist.gov/nistpubs/SpecialPublications/NIST.SP.800-52r1.pdf.

T. Dierks et al., "The TLS Protocol Version 1.0," Jan. 1999, 73 pages, Network Working Group, Request for Comments 2246, The Internet Society.

R. R Fielding et al., "Hypertext Transfer Protocol—HTTP/1.1," Jun. 1999, 160 pages, Network Working Group, Request for Comments 2616, The Internet Society.

T. Dierks et al., "The Transport Layer Security (TLS) Protocol Version 1.1," Apr. 2006, 87 pages, Network Working Group, Request for Comments 4346, The Internet Society.

T. Dierks et al., "The Transport Layer Security (TLS) Protocol Version 1.2," Aug. 2008, 104 pages, Network Working Group, Request for Comments 5246, The IETF Trust.

S. Turner et al., "Prohibiting Secure Sockets Layer (SSL) Version 2.0," Mar. 2011, 4 pages, Internet Engineering Task Force (IETF), Request for Comments 6176, IETF Trust and the persons identified as the document authors.

"FIPS PUB 140-2, Security Requirements for Cryptographic Modules," May 25, 2001, 69 pages, Federal Information Processing Standards Publication 140-2, Information Technology Laboratory, National Institute of Standards and Technology, U.S. Department of Commerce.

"Vulnerability Summary for CVE-2014-0224," Jun. 5, 2014, 10 pages, National Vulnerability Database, National Cyber Awareness System, National Institute of Standards and Technology, downloaded from https://web.nvd.nist.gov/view/vuln/detail?vulnId=CVE-2014-0224 on Nov. 17, 2015.

* cited by examiner

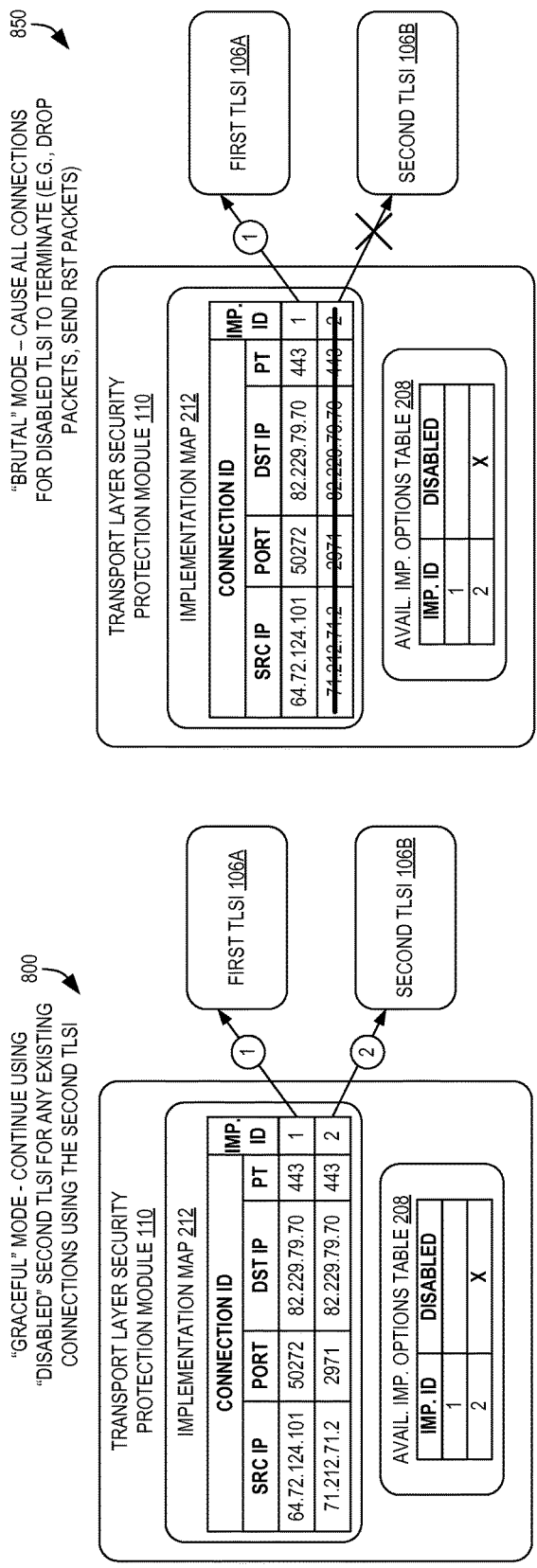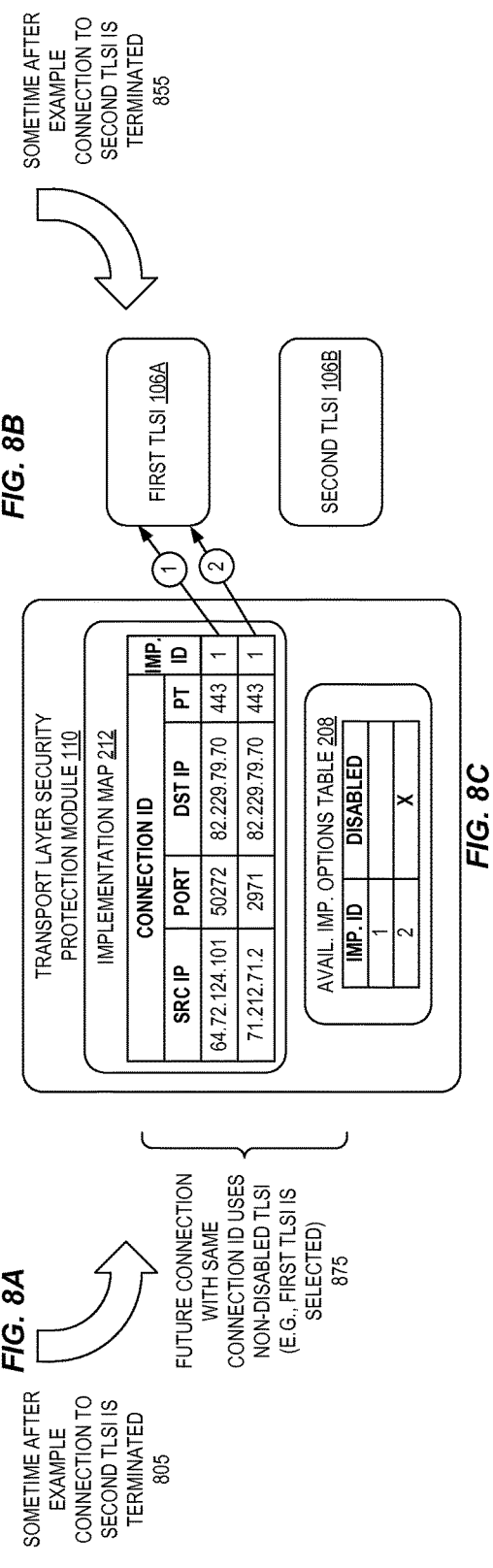

VIRTUAL ENCRYPTION PATCHING USING MULTIPLE TRANSPORT LAYER SECURITY IMPLEMENTATIONS

CROSS-REFERENCE TO RELATED APPLICATIONS

This application claims priority from U.S. Provisional Application No. 62/235,504, filed on Sep. 30, 2015, the content of which is incorporated by reference.

FIELD

Embodiments relate to the field of computer networking; and more specifically, to virtual encryption patching using multiple transport layer security implementations.

BACKGROUND

Transport Layer Security (TLS) and its predecessor, Secure Sockets Layer (SSL), are cryptographic protocols that provide communication security for transmitted data. TLS and SSL utilize asymmetric cryptography for authentication during a key exchange, symmetric cryptography to encrypt application layer data, and message authentication codes (MACs) to ensure the integrity of each transmitted message. Many different versions of TLS and SSL are widely used for an increasing variety of applications, including web browsing, electronic mail, instant messaging, and voice-over-IP (VoIP) as a few examples. TLS is an Internet Engineering Task Force (IETF) standards track protocol, which was first defined in IETF Request for Comments (RFC) 2246 as TLS 1.0, updated in IETF RFC 4346 as TLS 1.1, and again updated as TLS 1.2 in both RFC 5246 and RFC 6176. TLS is based upon versions 1.0, 2.0, and 3.0 of SSL.

As used herein, the terms "transport layer security protocol" or "encryption protocol" may be used generically to describe a TLS protocol, SSL protocol, or any other cryptographic protocol used for encrypting application layer data sent over a communications network (e.g., the Internet). Similarly, the terms "secure connection" or "encrypted connection" may be used to refer to communications between two electronic devices utilizing an encryption protocol to obfuscate some or all of the data (e.g., a payload such as application layer data or an encapsulated packet, etc.) sent over the connection.

As the world has become more interconnected and the Internet has become more essential in people's day-to-day lives, increasing amounts of sensitive data (e.g., financial account numbers, secret and confidential business or government information, personal photographs, etc.) are being transmitted over the Internet and thus, the use of and reliance upon transport layer security protocols to secure the transmission of this sensitive data has similarly increased. However, this shift has drawn the attention of attackers, who now increasingly seek to find ways to attack these encrypted communications to gain access to the sensitive data.

In addition to attacking the design vulnerabilities of transport layer security protocols (e.g., the "BEAST" attack preying upon a weakness in Cipher Block Chaining (CBC) Initialization Vector (IV) chaining used in SSL and TLS v1.0, the "Padding Oracle On Downgraded Legacy Encryption" or "POODLE" attack, the "triple-handshake" attack, etc.), another prominent target of attackers has been the different implementations of the transport layer security protocols used to create and utilize the secure connections.

Implementations of the SSL and TLS protocols are very typically very complex because they may support various versions, many cipher suites, and many cryptographic blocks, all of which may be defined by different specifications. Further, the session data structures needed to be implemented for these implementations are not trivial. As a result, the implementations are often subject to many bugs.

These implementation vulnerabilities are particularly dangerous because of the severity of the consequences of an exploit. Recently-detected implementation vulnerabilities have revealed that simple bugs in this library code can be exploited to acquire passwords stored in the memory of a server and/or gain the ability to cause remote code execution. Further, implementation bugs are often present in a library for many years allowing long-term attacks, and the risks can be even higher in open source libraries, which can easily be inspected and analyzed by attackers, allowing bugs to more readily be discovered. Moreover, many of the attacks are not easily discoverable by victims, as they often do not create easily-detectable side-effects.

As a few examples, the Java Secure Socket Extension (JSSE) SSL/TLS implementation has been found to be vulnerable to Bleichenbacher-type attacks. Mozilla's Network Security Services (NSS) library, used by the Chrome Browser and Firefox Browser (among others), was found to be vulnerable to yet another Bleichenbacher-type attack, named "BERserk." Apple's SecureTransport implementation, which is used by both iOS and OS X, was discovered to have a "goto fail" vulnerability. GNU Transport Layer Security Library (GNUTLS) implementations were found to be vulnerable to a man-in-the-middle attack. The Microsoft SChannel library, used by Windows, was found to be vulnerable to a "WinShock" attack that provides remote code execution vulnerability and/or server verification bypass. Moreover, both the SChannel library and the OpenSSL library were found to be vulnerable to a "Freak" attack, and perhaps most notably, the OpenSSL library was found to be vulnerable to a "Heartbleed" attack due to a bug in an implementation of a heartbeat extension that leads to a host with the vulnerable library (and the enabled heartbeat feature) to leak certain server memory content. This memory leak is sent in a heartbeat response packet, and can contain very sensitive data from the host, including cookies, passwords, SSL certificates, etc. Further, the attack can be repeated many times by an attacker to read more memory space. Such implementation vulnerability attacks are expected to continue to be discovered by attackers in increasing numbers.

In addition to just being vulnerable to stolen data or remotely-executed code due to a vulnerable implementation, the detection of a vulnerability creates significant amounts of other problems. Typically, upon the widespread dissemination of the news that a vulnerability has been found, a server operator may have to investigate whether their particular utilized implementation and/or software version is vulnerable, potentially shutdown their server immediately to avoid being compromised by an existing or future attacker, attempt to find a patch for the implementation, determine whether the patch will cause any further problems for their systems, apply the patch, determine whether the patch was successful in addressing the vulnerability, and then restart the server. Thus, discovered vulnerabilities result in a tremendous amounts of work for network administrators, and perhaps more importantly, can result in significant amounts of downtime for the affected servers, thus affecting active clients and potentially leading to violations of Service-level agreement (SLA).

Accordingly, there is a strong and growing need for techniques to protect against transport layer security implementation vulnerabilities and the negative consequences resulting from their detection.

BRIEF DESCRIPTION OF THE DRAWINGS

The invention may best be understood by referring to the following description and accompanying drawings that are used to illustrate embodiments of the invention. In the drawings:

FIG. 8A is a block diagram illustrating a transport layer security protection module operating in a graceful TLSI disablement mode according to some embodiments.

FIG. 8B is a block diagram illustrating a transport layer security protection module operating in a brutal TLSI disablement mode according to some embodiments.

FIG. 8C is a block diagram illustrating TLSI selection for a new connection after the connection termination and TLSI disablement depicted by FIG. 8A or FIG. 8B according to some embodiments.

DESCRIPTION OF EMBODIMENTS

Figure 1:
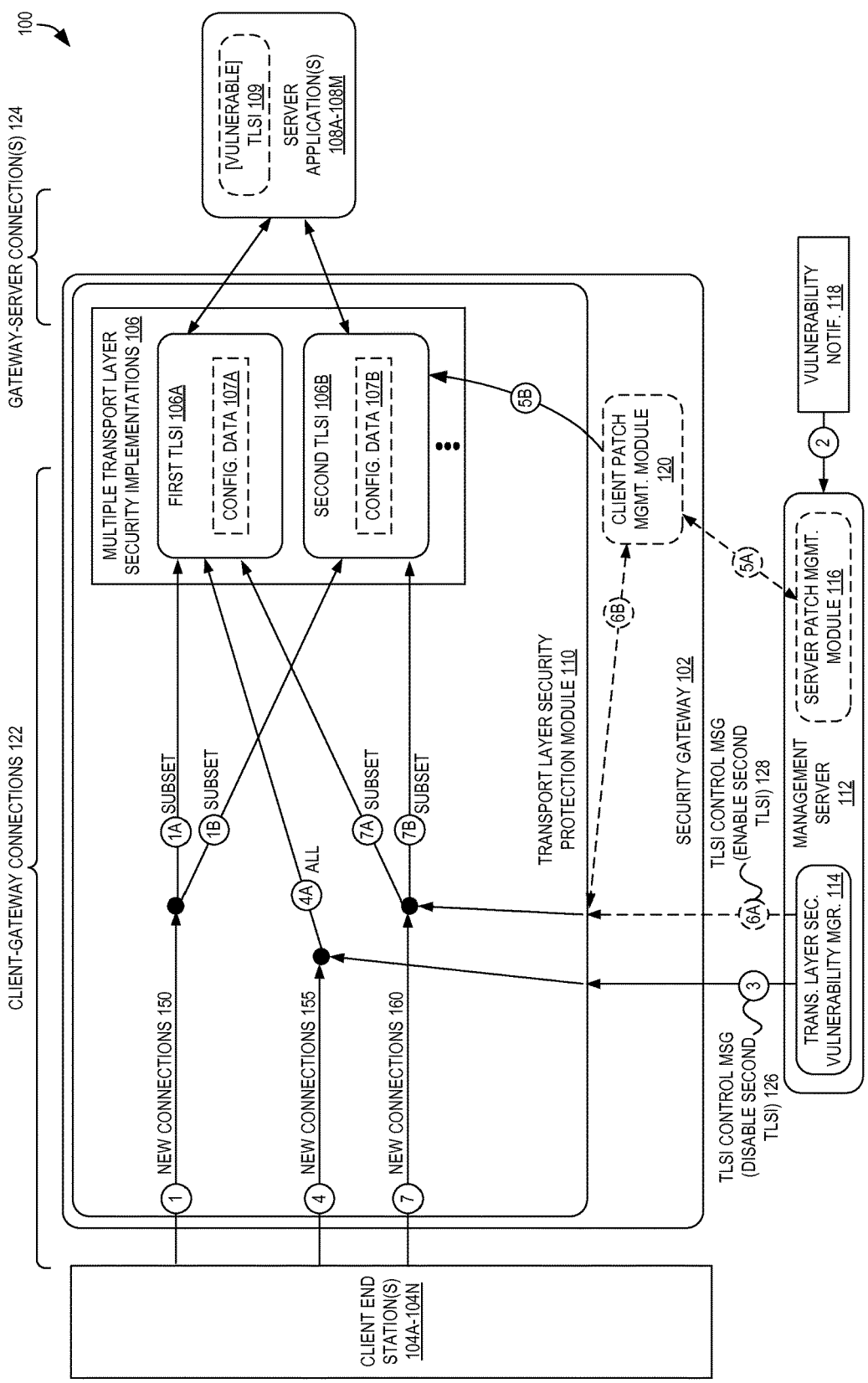
FIG. 1 is a block diagram illustrating a system including a security gateway including multiple transport layer security implementations for virtual encryption patching according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms may be used interchangeably herein to refer to a URI, which is a string of characters used to identify a resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware.

Embodiments disclosed herein relate to the field of computer networking, and more specifically, to virtual encryption patching using multiple transport layer security implementations. According to some embodiments, a security gateway includes multiple Transport Layer Security Implementations (TLSI) that can be used for creating secure communications channels to carry application-layer traffic between one or more clients and one or more server applications. In some embodiments, upon determining that one of the multiple TLSIs contains a security vulnerability, that TLSI can be disabled, leaving one or more others of the multiple TLSIs enabled and available to be used to carry traffic of new connections between the clients and server applications. Thus, the server applications can be "virtually" patched by being protected against a vulnerability by removing an affected TLSI from use, despite the fact that the server application may continue to use a vulnerable TLSI.

In some embodiments, one of the multiple TLSIs can be selected to perform transport layer security protocol functions for traffic of a new connection according to a selection scheme. The selection scheme can be random and based upon equal odds of selection (e.g., split traffic across the multiple TLSIs with approximately equal distributions) or involve a bias or weight such that certain of the TLSIs are selected with differing probabilities than others of the multiple TLSIs. Additionally, in some embodiments the selection scheme can be deterministic and thus cause certain connections (e.g., those originating from a same source IP address and source port) to always be processed by a particular TLSI, provided that it is enabled.

In some embodiments, the security gateway can determine that a TLSI is to be disabled and in response, disable the TLSI such that it is not eligible to be utilized for new connections. In some embodiments, existing connections processed by the now-disabled TLSI may continue being processed by the TLSI until their natural termination or until an expiration of a time period, at which point they can be forcefully terminated. In some embodiments, existing connections processed by the now-disabled TLSI may immediately be forcefully terminated.

In some embodiments, the security gateway can patch a disabled TLSI and, optionally, determine that an enablement condition has been met, and as a result re-enable the TLSI to make it again eligible to be utilized for new connections.

In various embodiments, the security gateway can implement the multiple TLSIs in a variety of ways. For example, a transport layer security switch module can receive traffic from clients and utilize Application Programming Interface (API) or function calls to interact with the TLSI. As another example, the TLSIs can be implemented by standalone processing modules that can be provided connection traffic from the transport layer security switch module via Inter-Process Communication (IPC) mechanisms such as named pipes. As another example, the transport layer security switch module can send received traffic to the standalone processing modules using a distinct port corresponding to one of the multiple TLSIs, and/or using a network address (e.g., Internet Protocol (IP) address) corresponding to one of the multiple TLSIs.

In some embodiments, the security gateway can operate as a transparent proxy and thus remain "invisible" to the clients and server applications, and in some embodiments can operate as a reverse proxy and thus act as a visible endpoint from the perspective of the clients as well as the server applications.

Accordingly, embodiments can quickly remove a vulnerable TLSI from use while still allowing secure connectivity through remaining enabled TLSIs. Further, any TLSI utilized by the server applications will be insulated from being exploited due to an implementation vulnerability because an attacker cannot directly interact with the server applications; thus, a potentially vulnerable TLSI utilized by the server application(s) can be viewed as being "virtually" patched. Some embodiments can also, upon disabling a vulnerable TLSI, allow existing connections to naturally terminate, such as when the particular client and server application have completed their intended tasks, thus not affecting in-flight traffic while ensuring that all subsequent connections will not use the vulnerable TLSI.

For further detail, we turn to FIG. 1, which is a block diagram illustrating a system 100 including a security gateway 102 with a transport layer security protection module 110 (or, "protection module 110") including multiple transport layer security implementations 106 for virtual encryption patching according to some embodiments. FIG. 1 includes security gateway 102 that is communicatively coupled between a plurality of client end stations 104A-104N and one or more server applications 108A-108M. Thus, the security gateway 102 is placed on a communications path between the plurality of client end stations 104A-104N and the one or more server application(s) 108A-108M such that traffic passing between will flow through the security gateway 102.

Each of these client end stations 104A-104N can be a computing device operable to execute one or more applications seeking to communicate with the server application(s) 108A-108M. There are a wide variety of types of client end stations 104A-104N, including but not limited to workstations/Personal Computers (PCs), server computers, laptops, netbooks, mobile phones, smartphones, multimedia phones, smart watches, Voice Over Internet Protocol (VOIP) phones, user equipment (UE), terminals, portable media players, Global Positioning System (GPS) units, gaming systems, wearable computing devices, set-top boxes, etc.

Figure 11:
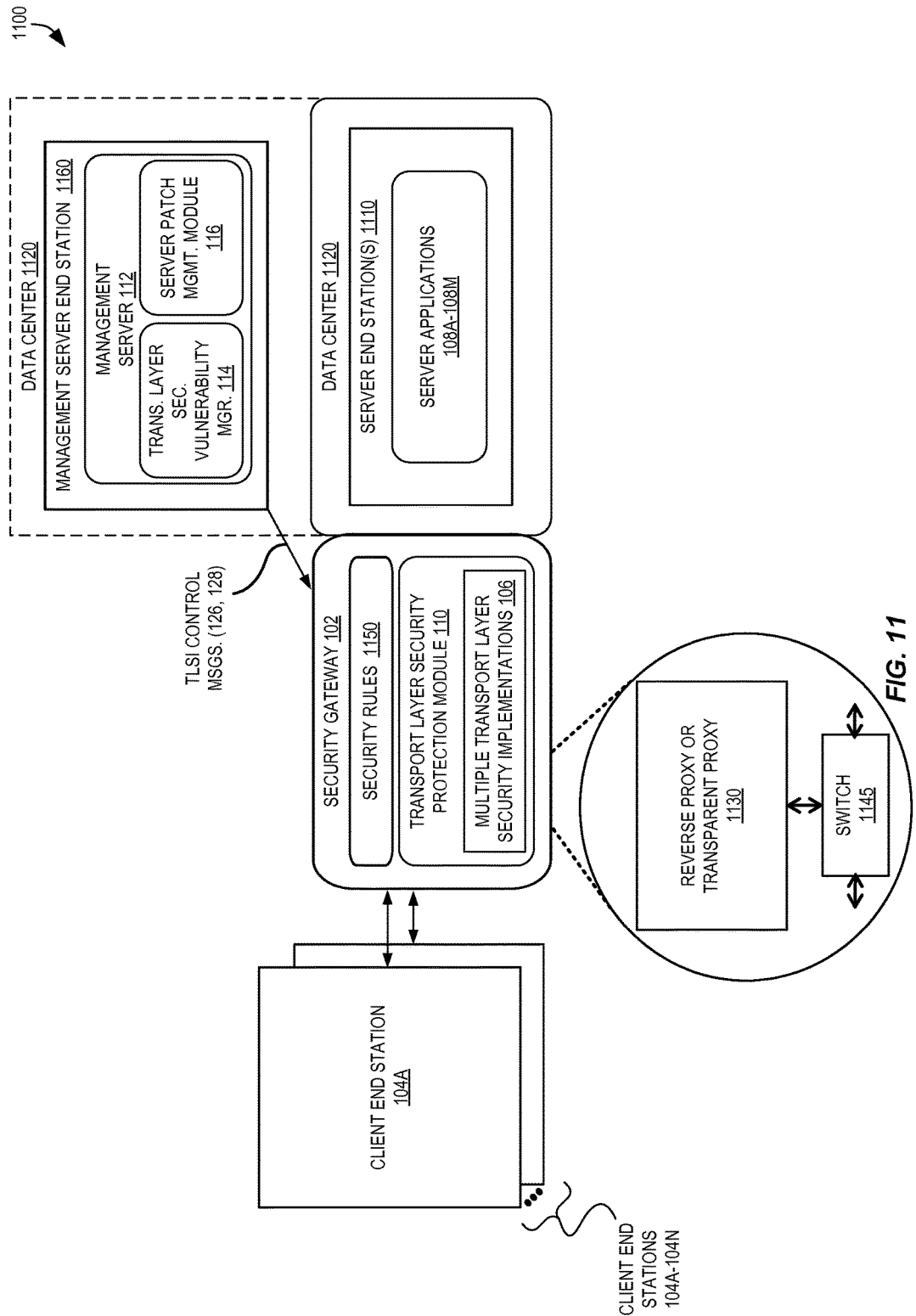
FIG. 11 is a block diagram illustrating an exemplary deployment of a security gateway including a transport layer security protection module according to some embodiments.

Similarly, the server application(s) 108A-108M can be any of a variety of types of applications, as will be detailed further herein with regard to FIG. 11. Thus, the client end stations 104A-104N and server application(s) 108A-108M may seek to communicate using any of a variety of protocols for a variety of purposes, including but not limited to utilizing HyperText Transfer Protocol (HTTP)/Hypertext Transfer Protocol over TLS/SSL (HTTPS), Telnet, File Transfer Protocol (FTP)/FTP Secure (FTPS), Simple Mail Transfer Protocol (SMTP), Internet Message Access Protocol (IMAP), Post Office Protocol (POP), Simple Network Management Protocol (SNMP), Network File System (NFS), Server Message Block (SMB), Common Internet File System (CIFS), Session Initiation Protocol (SIP), etc. Additionally, the client end stations 104A-104N may seek to create Virtual Private Networks (VPNs) with the server application(s) 108A-108M (e.g., a VPN server), or with a VPN server located within a same network as the server application(s) 108A-108M, perhaps for the purpose of communicating with the server application(s) 108A-108M.

In various embodiments, the communications path between the client end stations 104A-104N and the server application(s) 108A-108M includes at least two connections: one or more client-to-gateway connections 122, and one or more gateway-to-server connections 124. Accordingly, the security gateway 102 can be configured as a reverse proxy, transparent proxy, etc., and thus "terminate" the desired connection between the client end stations 104A-104N and the server application(s) 108A-108M. Additionally, in some embodiments the path further includes a connection within the security gateway 102.

According to some embodiments, at least one of (or both of) the client-gateway connections 122 and gateway-server connections 124 are secure (e.g., encrypted) connections, such as TCP/IP (Transmission Control Protocol/Internet Protocol) connections secured a using transport layer security protocol such as SSL or TLS. Thus, in some embodiments both of the client-gateway connections 122 and gateway-server connections 124 are secure connections, but in some embodiments when the client-gateway connections 122 are secure connections, some (or all) of the gateway-to-server connections 124 may be non-secure or "plaintext" connections (e.g., TCP/IP without any transport layer security protocol being utilized). Thus, the server application(s) 108A-108M may or may not include a TLSI 109, and if a TLSI 109 does exist, it may or may not be the same as one deemed to be vulnerable.

Turning to the illustrated circle '1', the client end stations 104A-104N form new connections 150 that are terminated at the protection module 110 of the security gateway 102 in an effort to ultimately communicate with server application(s) 108A-108M. The connections 150 can be secure connections. The protection module 110, for each of the new connections 150 being established, selects one of the multiple TLSIs 106 to be utilized for that connection. In some embodiments, the protection module 110 selects one of the TLSIs from those of the multiple TLSIs 106 that are configured as being enabled for use.

In the illustrated example, a subset of one or more of the new connections 150 are selected to be processed using a first TLSI 106A (at circle '1A'), and another subset of one or more of the new connections 150 are selected to be processed using a second TLSI 106B (at circle '1B'). Of course, in some embodiments more than two TLSIs 106 are utilized, and thus the new connections 150 can be divided among any number of TLSIs 106.

Each of the multiple TLSIs 106 can be an implementation of one or more transport layer security protocols. For example, one TLSI (e.g., TLSI 106A) could be the OpenSSL library, which is an open-source implementation of the SSL and TLS protocols that implements certain cryptographic functions or algorithms (e.g., ciphers, cryptographic hash functions, public-key cryptography mechanisms, etc.) that can be used for creating and utilizing secure communications channels. In addition to OpenSSL, there are many different TLSIs that could be utilized, including but not limited to GnuTLS, Network Security Services (NSS), SChannel, LibreSSL, Java Secure Socket Extension (JSSE), cryptlib, MatrixSSL, RSA BSAFE, etc.

One or more of the multiple TLSIs 106 can be "off-the-shelf" TLSIs, meaning that they are created and/or distributed by another entity that is separate from the entity using the TLSIs (e.g., separate from the owner/manufacturer/user of the security gateway 102). An "off-the-shelf" TLSI may or may not be in the exact same form as provided by the creator/distributor of the TLSI, and typically can include certain configuration-type customizations made by the entity using the TLSI. For example, a representative of the TLSI-using entity (e.g., a network administrator of a company) may change certain configuration data (107A, 107B, etc.) settings such as prohibiting the TLSI from utilizing certain ciphers or protocol versions, for example.

In contrast to "off-the-shelf" TLSIs, in some embodiments, one or more (or all) of the multiple TLSIs 106 may be "proprietary" implementations that are not off-the-shelf (e.g., may not be distributed and/or made available to the public). In some embodiments, at least one of the multiple TLSIs 106 is an off-the-shelf TLSI and at least one of the multiple TLSIs 106 is a proprietary implementation.

In some embodiments, one or more of the multiple TLSIs 106 may be accredited. For example, some organizations (such as government agencies) may review a TLSI and grant it an accreditation indicating that it is verified as meeting certain standards. One such accreditation is the Federal Information Processing Standard (FIPS) Publication 140-2, (FIPS PUB 140-2), titled "Security Requirements for Cryptographic Modules" and commonly referred to as the "FIPS" accreditation or "FIPS 140" accreditation, although a FIPS 140-1 standard also exists. In some embodiments, all of the multiple TLSIs 106 can be FIPS-accredited, but in other embodiments, zero, one, or more of the multiple TLSIs 106 can be FIPS-accredited. Further, an accredited TLSI may be off-the-shelf or proprietary.

Thus, the first subset of the new connections 150 will be processed using a first TLSI 106A and the second subset of the new connections 150 will be processed using a second TLSI 106B. This processing can include any of decrypting encrypted data received from the client end stations 104A-104N, encrypting data to be sent back to the client end stations 104A-104N, performing transport layer security protocol handshake functions, etc. In some embodiments, the decrypted payloads from the traffic of these connections can be provided to the ultimate destination server application(s) 108A-108M over the secure or insecure gateway-server connections 124. Similarly, traffic received from the server application(s) 108A-108M and ultimately destined to the client end stations 104A-104N can be received over the gateway-server connections 124 (and possibly decrypted, if necessary), and encrypted by the selected TLSI 106 to be passed back to the client end stations 104A-104N over client-gateway connections 122.

Continuing the illustrated example of FIG. 1, at some point in time a vulnerability of one of the multiple TLSIs 106 is discovered, and a vulnerability notification 118 is provided at circle '2' to a management server 112. The vulnerability notification 118 can be a variety of types of inputs, including a user input from an administrator into a user interface, an electronic message received from another electronic device and/or entity (e.g., an external vulnerability notification service, a developer/manufacturer/creator of the security gateway 102 and/or protection module 110, etc.). The vulnerability notification 118 can identify one or more particular TLSIs, and further may identify particular affected or non-affected software versions of those TLSIs. In some embodiments, the vulnerability notification 118 may also identify details describing the particular vulnerability and/or identify how to patch the affected TLSIs or acquire patches for the affected TLSIs.

In response, a transport layer security vulnerability manager 114 (or "vulnerability manager 114") can transmit a TLSI control message 126 to the security gateway 102 at circle '3'. In some embodiments, this transmission occurs only when the vulnerability manager 114 determines that the protection module 110 actually includes a particular TLSI affected by the vulnerability, but in some embodiments the vulnerability manager 114 may transmit the TLSI control message 126 identifying the affected TLSIs and/or versions thereof, and let the protection module 110 determine whether the TLSI control message 126 is relevant based upon comparing its known TLSIs and/or versions to those identified by the TLSI control message 126.

In this example, we assume that the TLSI control message 126 indicates that the second TLSI 106B is affected by the vulnerability. In response, the protection module 110 can cause the second TLSI 106B to be disabled and thus, no longer be eligible to be used for processing new connections.

In some embodiments, the protection module 110 may also determine that existing connections utilizing the second TLSI 106B (e.g., the second subset illustrated at circle '1B') are to be forcefully dropped, though in other embodiments the protection module 110 may be configured to allow any such existing connections to naturally terminate (e.g., allow the corresponding client end station and/or server application to terminate the connection per their normal course of communications) or allow existing connections to naturally terminate for up to an amount of time, and upon reaching that amount of time the protection module 110 may then forcefully drop any remaining connections still utilizing the second TLSI 106B. Further detail describing these options will be presented later herein with regard to FIGS. 8A, 8B, and 8C.

Upon disabling the second TLSI 106B, for additional new connections 155 being created at circle '4', the protection module 110 will again select a TLSI from those of the multiple TLSIs 106 that are enabled to be utilized for the additional new connections 155. In this example illustrating only two TLSIs 106A-106B, the disablement of the second TLSI 106B causes the remaining set of enabled TLSIs to include only the first TLSI 106A. Thus, all of the new connections 155 will be processed by the first TLSI 106A at circle '4A'.

According to some embodiments, the disabled second TLSI 106B may be patched, which can occur before or after the transmission of the TLSI control message 126. The patching process can occur in a variety of ways.

As a first example, in some embodiments the TLSI control message 126 includes a patch script/program, specifies how to perform a patch (e.g., describes operations to be performed), and/or identifies how to acquire a patch, and thus, a client patch management module 120 can perform the patching based upon this information at circle '5B'. For example, the client patch management module 120 can execute a patch script received with the TLSI control message 126, fetch a patch identified by the TLSI control message 126 and execute it, etc.

As another example, the client patch management module 120 may be configured to periodically patch software of the security gateway 102 through its own update procedures, and thus may download and apply a patch at circle '5B' without explicitly depending upon the TLSI control message 126.

As yet a further example, in some embodiments a server patch management module 116 may determine that a patch needs to be applied for the second TLSI 106B, and at circle '5A', transmit a message to the client patch management module 120 to cause it to apply the patch at circle '5B.' This message can include an instruction to cause the client patch management module 120 look for new patches, the patch itself, an identifier (e.g., a Uniform Resource Locator) allowing the client patch management module 120 to download the patch, etc.

The execution of the patch, at circle '5B', can include modifying or replacing a binary associated with the second TLSI 106B, modifying configuration data 107B values of the second TLSI 106B (e.g., disabling a cipher), acquiring new or modifying existing source code of the second TLSI 106B (and interpreting or compiling the resulting source code), etc.

In some embodiments, when the second TLSI 106B has been patched (and optionally tested, verified, etc.), the second TLSI 106B can be re-enabled. This re-enablement can occur in a variety of ways.

As a first example, in some embodiments the original TLSI control message 126 can include an instruction to re-enable the second TLSI 106B upon it being successfully patched. Thus, the TLSI control message 126 could cause the second TLSI 106B to be disabled, cause the client patch management module 120 to apply the patch, and also cause the client patch management module 120 to re-enable the second TLSI 106B (see circle '6B') by sending a command to the protection module 110.

In some embodiments, the TLSI control message 126 can include an enablement condition which, when determined to be true, indicates that the second TLSI 106B is to be re-enabled. For example, the enablement condition could specify a particular or minimum version number of the second TLSI 106B that needs to be installed before it can be re-enabled. Alternatively, the enablement condition could specify a condition that must not exist for the second TLSI 106B to be re-enabled—for example, that the second TLSI 106B cannot be running the vulnerable version "1.0.5". In addition to being sent in the TLSI control message 126, this enablement condition could also be sent by the server patch management module 116 and/or within a second TLSI control message 128 (see circle '6A').

As a more detailed example, a "ChangeCiperSpec (CCS) Injection Vulnerability" (CVE-2014-0224) is a security bypass vulnerability that exists in some versions of the OpenSSL TLSI due to a weakness in OpenSSL methods used for keying material. OpenSSL clients were known to be vulnerable in all versions of OpenSSL before the versions 0.9.8za, 1.0.0m and 1.0.1h, but servers were known to be vulnerable in OpenSSL versions 1.0.1 and 1.0.2-beta1. Accordingly, the enablement condition could specify that the version of OpenSSL needs to be greater than any of these affected versions in order to be enabled. Alternatively (or additionally), the enablement condition could specify that none of those particular affected versions can be installed in order to be enabled.

As a second example of re-enablement, in some embodiments the message from the server patch management module 116 (at circle '5A') could instruct the client patch management module 120 to re-enable the second TLSI 106B (at circle '6B') if the patch was applied successfully. As mentioned above, this message could include an enablement condition that the client patch management module 120 can evaluate to determine when and whether it should re-enable the second TLSI 106B.

As a third example of re-enablement, in some embodiments an additional TLSI control message 128 can be sent by the vulnerability manager 114 (at circle '6A') to enable the second TLSI 106B. This can occur responsive to the server patch management module 116 (at circle '5A') determining that a patch was successfully applied. Additionally, as mentioned above, this TLSI control message 128 could include an enablement condition that the security gateway 102 can evaluate to determine when and whether it should re-enable the second TLSI 106B.

Of course, there are other configurations for causing the re-enablement of the disabled TLSI and thus, these examples are provided as illustrative rather than limiting. Regardless, upon the second TLSI 106B becoming re-enabled (at circle '6A' or '6B', for example), at circle '7' the protection module 110 will again select a TLSI from those of the multiple TLSIs 106 that are enabled to be utilized for the new connections 160. In this example illustrated by FIG. 1 illustrating only two TLSIs 106A-106B, the re-enablement of the second TLSI 106B causes the set of enabled TLSIs to include both the first TLSI 106A and the second TLSI 106B. Thus, a subset of the new connections 160 will be processed by the first TLSI 106A at circle '7A', and another subset of the new connections 160 will be processed by the second TLSI 106B at circle '7B'.

Accordingly, operation can continue with additional new connections (not illustrated) being divided among those TLSIs within a set of enabled TLSIs at any point in time. However, a small and unlikely edge case can exist where only one TLSI is remaining as enabled, and a vulnerability for this one TLSI is found and thus the one TLSI could perhaps be disabled. Although this corner case is quite unlikely due to the system's relatively quick speed of patching and re-enabling TLSIs—especially compared with the relatively slow frequency of vulnerabilities being detected in practice—the system 100 can be robustly configured to account for this scenario in a variety of ways.

As one example, in some embodiments the system 100 may do nothing—i.e., do not disable the remaining TLSI—which may be a best solution when continuing to provide service (albeit with an existing vulnerability) is more important than not providing service but having a secure system. Additionally, in some embodiments the system 100 may disable the remaining TLSI, which could be preferred when security interests outweigh the need to continue operation. Again, many such possibilities exist, and certain embodiments can flexibly allow for the owner (e.g., the owner of the server application(s) 108A-108M) to select which option is best in each deployment.

Figure 2:
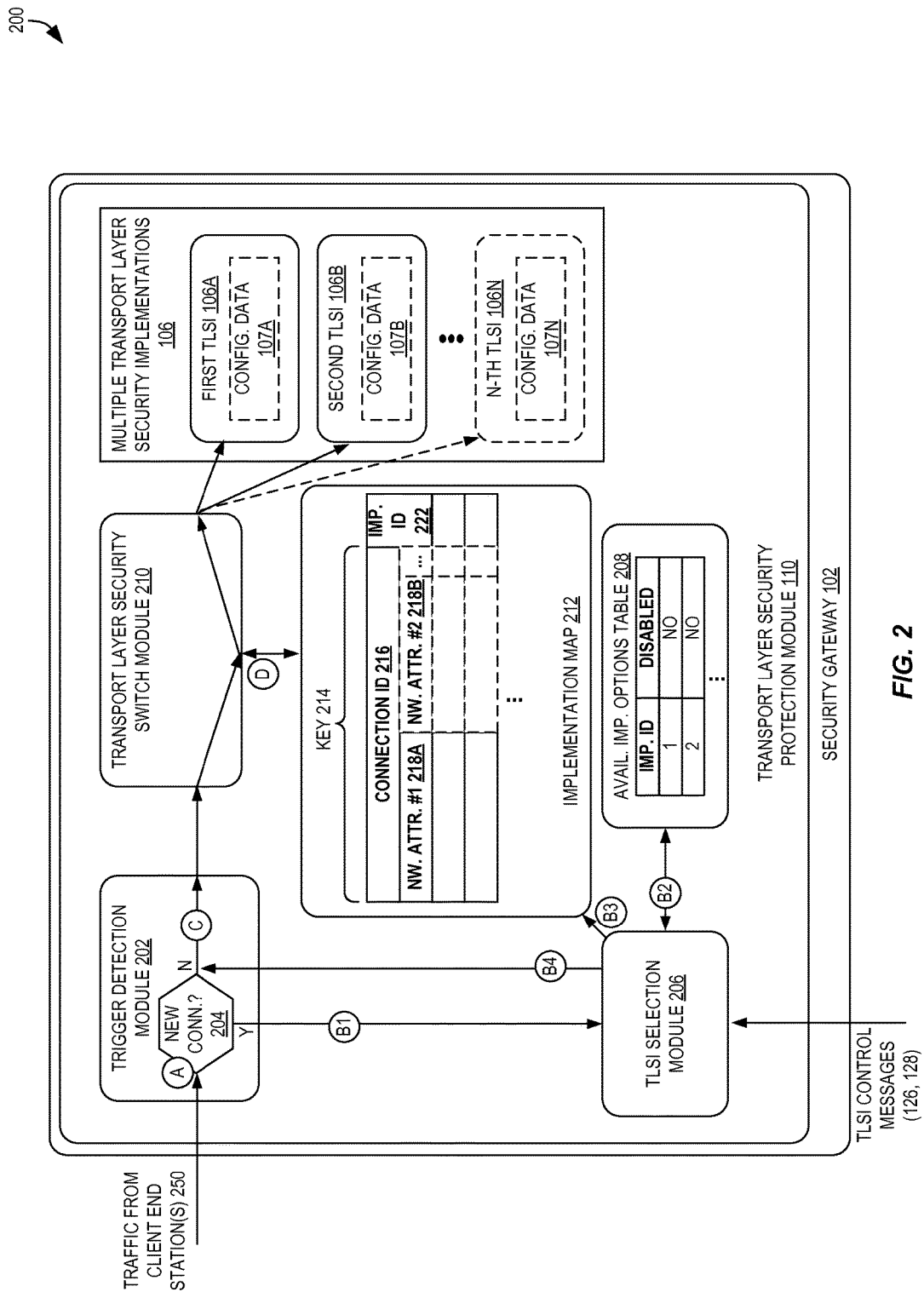
FIG. 2 is a block diagram illustrating subcomponents and data flows within a transport layer security protection module of a security gateway according to some embodiments.

For further detail illustrating the components of the protection module 110, we turn to FIG. 2, which is a block diagram illustrating subcomponents and data flows within a transport layer security protection module 110 of a security gateway 102 according to some embodiments. The illustrated protection module 110 includes, in addition to the multiple TLSIs 106 also depicted in FIG. 1, a trigger detection module 202, a transport layer security switch module 210, an implementation map 212, a TLSI selection module 206, and an available implementation options table 208. These units will be described with reference to traffic 250 arriving from the one or more client end stations 104A-104N.

Circle 'A' illustrates the receipt, at the trigger detection module 202, of a packet from a first client end station 104A (of the client end stations 104A-104N). The trigger detection module 202 is configured to determine, at decision block 204, whether the packet is part of a new connection being established that will (or may) need transport layer security protocol processing. For example, decision block 204 can include determining whether the packet is a TCP SYN packet, which is a packet sent as part of the TCP "three-way handshake" connection establishment. Of course, there are other ways to determine whether a new connection is being created that will (or may) need transport layer security protocol processing, and thus block 204 could include, for example, determining whether a received packet carries a "Client Hello" handshake packet.

When decision block 204 results in a determination of a new connection being formed, at circle 'B1' the TLSI selection module 206 is configured to determine which of the multiple TLSIs 106 is to be utilized for the connection. In some embodiments, at circle 'B2' the TLSI selection module 206 utilizes the available implementation options table 208 to determine a set of "enabled" TLSIs to choose between.

In this depicted example, the available implementation options table 208 includes an association of implementation identifiers and "disabled" indicators, however many other data types could be utilized to allow the set of enabled TLSIs to be determined and other data values (e.g., an "enabled" indicator instead of a "disabled" indicator) could similarly be utilized and be easily recognized and implemented by those of skill in the art. As illustrated, the available implementation options table 208 indicates that neither the first TLSI 106A nor the second TLSI 106B are disabled and thus, the set of enabled TLSIs from which to choose from includes at least these two TLSIs 106A-106B. Of course, in some embodiments there are more than two TLSIs (see, e.g., the representation of the N-th TLSI 106N, configuration data 107N, as well as the ellipsis at the end of the available implementation options table 208), and thus the set of enabled TLSIs could include additional TLSIs.

Based upon the set of enabled TLSIs, the TLSI selection module 206 can then select one of the TLSIs to be utilized for the new connection according to a selection scheme. Various embodiments utilize different selection schemes, and in some embodiments the selection scheme utilized can be chosen by an administrator for one or more of the server application(s) 108A-108M). As one example, the selection scheme can be random and based upon equal odds of selection. Thus, the new connections may be split across the multiple TLSIs 106 with approximately equal distributions. As another example, the new connection selection could involve a bias or weight, such that certain of the multiple TLSIs 106 are selected with differing probabilities than others of the multiple TLSIs 106. For example, in a system utilizing two TLSIs, and one of the TLSIs is known to be a slower implementation, the selection of that slower implementation can be weighted such that its selection is less likely than the selection of the other, faster TLSI.

Further, some embodiments do not utilize a purely randomized scheme and thus, the selection scheme can cause certain connections to deterministically be processed by a particular TLSI, provided that it is enabled. As one example, a selection scheme could utilize the result of a function (e.g., a deterministic function such as a hash function) being applied to one or more attributes of the packet to determine which TLSI is to be selected. For example, the selection scheme could compute an MD5 hash using a source IP address of the packet, and based upon one or more bit values of the result, select the TLSI. This example results in a system where all connections coming from a single IP address will be processed by a particular TLSI, provided that it remains enabled. The use of such a "deterministic" selection scheme can provide some benefits, such as supporting re-handshakes/SSL tickets, which would need to be processed using the same TLSI as a previous connection.

Upon selecting a TLSI to be utilized for the connection, the TLSI selection module 206 can then create an entry in the implementation map 212 at circle 'B3' to maintain an association between the connection and the selected TLSI. The implementation map 212 may be based upon of a variety of different data structures and include different data than as illustrated. However, this exemplary implementation map 212 includes one or more network attributes 218A, 218B, etc., as well as an implementation identifier 222.

The one or more network attributes 218A, 218B utilized can be selected as to identify a connection (or set of connections) and form a key 214 that can be used to lookup the associated TLSI for future packets of the connection. As one example, the selected network attributes 218A, 218B, etc., can include the 4-tuple of a Source IP address, a Source Port number, a Destination IP address, and a Destination Port number, although in other embodiments many different possible network attributes 218 and/or groupings of network attributes 218 can be utilized, provided that they in combination can identify one or more connections.

The implementation identifier 222 can also be any of a variety of different types of values, provided that a chosen implementation identifier 222 can be used by the protection module 110 to provide packets (or portions of packets, such as a packet payload) to the associated TLSI. For example, an implementation identifier 222 can simply be a group of bits having different values that represent different TLSIs. For example, in an embodiment including four TLSIs 106, the implementation identifier 222 could be a two-bit value, such that each possible binary value represents one of the four TLSIs 106 (e.g., '00' represents a first TLSI 106A, '01' represents a second TLSI 106B, '10' represents a third TLSI 106C, and '11' represents a fourth TLSI 106D). Additionally, the implementation identifier 222 could be another type of identifier associated with a TLSI, such as a port number at which a module using a particular TLSI is bound, an IP address utilized by a module using a particular TLSI, etc. Further detail regarding different implementation identifiers 222 will be presented later herein with regard to the other figures.

At circle 'B4', the flow can logically continue back at the trigger detection module 202. This can be a same logical point at which if, at decision block 204, the trigger detection module 202 determined that the packet was part of a connection that already had an associated TLSI.

Thus, at circle 'C', flow continues to the transport layer security switch module 210, which can utilize the implementation map 212 to identify which of the TLSIs is associated with the connection that the packet is part of (or, the packet seeks to form). In some embodiments, the transport layer security switch module 210 is configured to generate a key 214 using the corresponding network attributes 218 of the packet, and cause the implementation map 212 to be searched using the key 214 to identify the TLSI that will process packets of the connection. Once the TLSI is identified, the packet (or portions thereof) may be provided to the particular TLSI corresponding to the identified implementation identifier 222 resulting from the implementation map 212 lookup.

Notably, the operations/flow of this figure can be different in certain circumstances, though one of skill would be readily able to understand these circumstances and what modifications to the diagram would be necessary. For example, in some embodiments when the analyzed packet from the client end stations is a TCP handshake-type packet, the packet may or may not actually be provided to a corresponding TLSI, since the TLSI itself may not be involved in performing transport layer protocol functions. Instead, for example, packets related to performing transport layer security protocol handshakes, and/or packets having payloads that are encrypted via the transport layer security protocol may be provided to the corresponding TLSI. By way of example, FIGS. 3 and 4 illustrate embodiments where not every packet would be provided to the corresponding TLSI.

Figure 3:
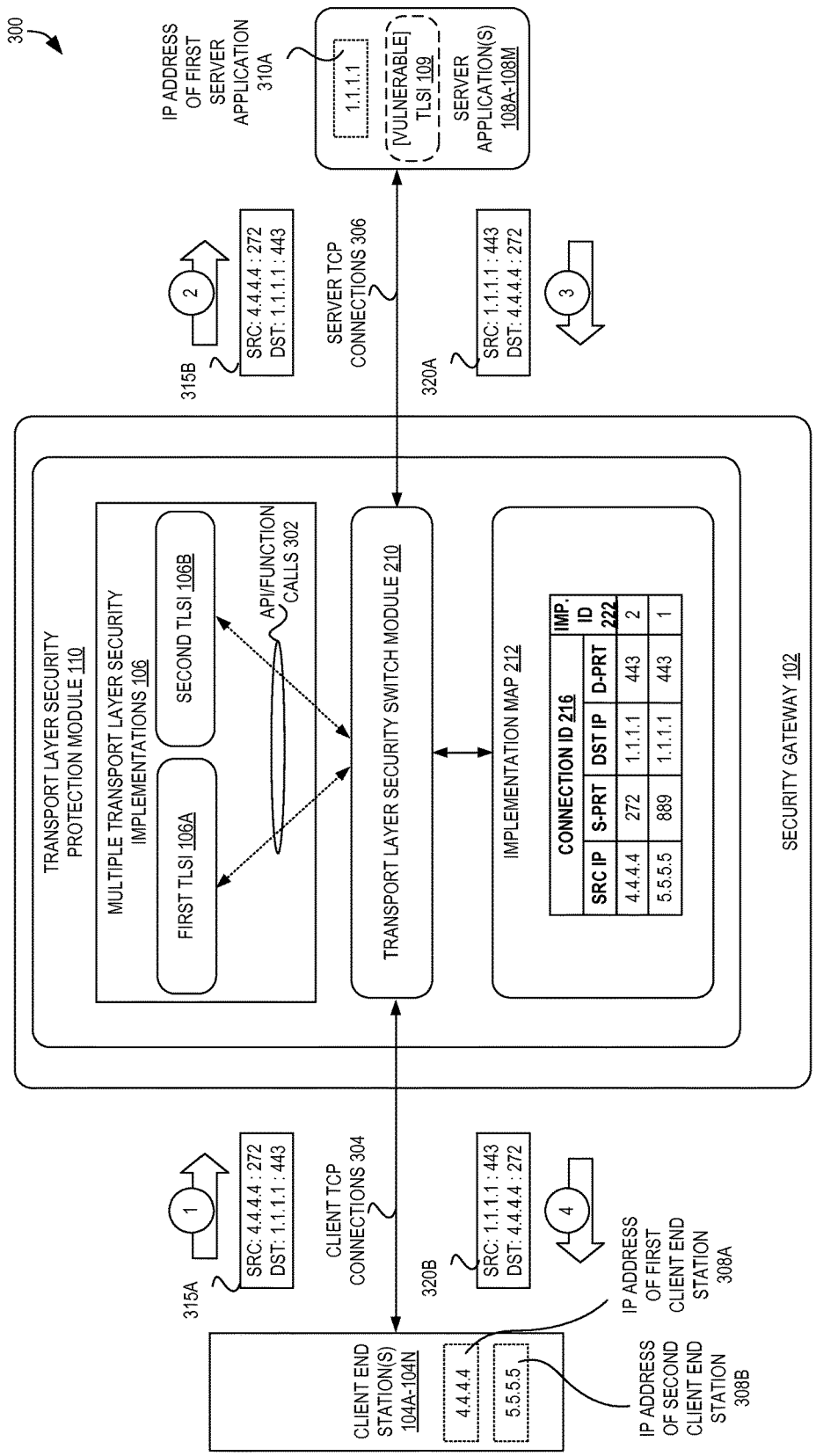
FIG. 3 is a block diagram illustrating the utilization of multiple TLSIs via direct library calls by a transport layer security switch module of a security gateway configured as a transparent proxy according to some embodiments.
Figure 4:
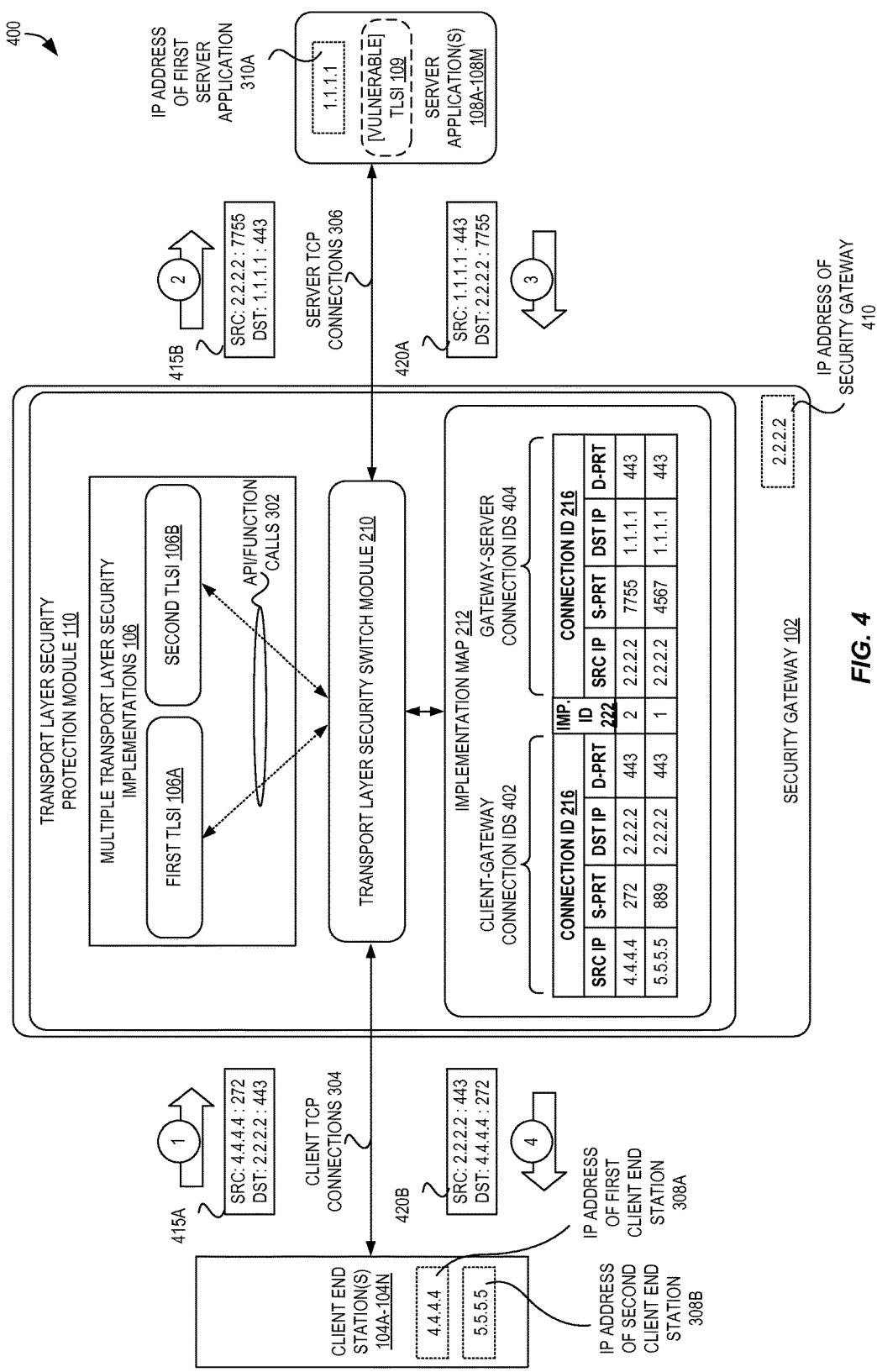
FIG. 4 is a block diagram illustrating the utilization of multiple TLSIs via direct library calls by a transport layer security switch module of a security gateway configured as a reverse proxy according to some embodiments.

FIG. 3 is a block diagram illustrating the utilization of multiple TLSIs via direct library calls 302 by transport layer security switch module 210 of a security gateway 102 configured as a transparent proxy according to some embodiments. A transparent proxy, which can also be referred to as an intercepting proxy, inline proxy, or forced proxy, intercepts normal communication at the network layer without requiring any special client configuration and thus, the transmitting and receiving entities need not be aware of the existence of the proxy. Accordingly, a transparent proxy can terminate the connections of the client end stations 104A-104N and the server application(s) 108A-108M without revealing that these connections are being terminated.

In the illustrated system 300 of FIG. 3, we assume that a first client end station 104A exists utilizing an IP address 308A of "4.4.4.4", and that a second client end station 104B exists utilizing an IP address 308B of "5.5.5.5". We further assume that a server application 108A utilizes an IP address 310A of "1.1.1.1".

In this depicted embodiment, the protection module 110 includes a transport layer security switch module 210 that utilizes client-side TCP connections 304 and server-side TCP connections 306 and, for implementing a transport layer security protocol, issues API/function calls to the multiple TLSIs 106 to perform the transport layer security protocol-related tasks. As one example, with the OpenSSL TLSI, a "BIO" library could be used to access the underlying functionality provided by the OpenSSL library. A BIO is an Input/Output (I/O) abstraction which hides many of the underlying I/O details from an application, and can transparently handle SSL/TLS connections, unencrypted network connections, file I/O, etc. Thus, in an embodiment the transport layer security switch module 210 can be configured to utilize BIO and issue API calls 302 (e.g., SSL_connect( ), SSL_read( ), SSL_write( ), etc.) to access the OpenSSL TLSI.

In this depicted example, the implementation map 212 includes a connection identifier 216 (which can be the key used to perform a lookup) using a 4-tuple of source IP, source port, destination IP, and destination port. In this example, the implementation identifier 222 is represented by a decimal number that uniquely identifies one of the multiple TLSIs 106.

Thus, an exemplary flow of a communication between the first client end station 104A (at IP address 308A of "4.4.4.4") will be detailed to aid in understanding of aspects of the embodiment. In this example, we start at circle '1', where a packet 315A is sent over one of the client TCP connections 304 by the first client end station 104A and is destined to the IP address 310A of server application 108A. Thus the source IP address is "4.4.4.4", the source port is "272", the destination IP address is "1.1.1.1", and the destination port is "443".

The transport layer security switch module 210 can form a key using the network attributes of the packet 315A to perform a lookup in the implementation map 212, and determine that the implementation identifier 222 is "2" (which we assume is associated with the second TLSI 106B). Thus, the transport layer security switch module 210 can provide the packet payload (or the whole packet) to the second TLSI 106B by issuing an API call 302. The second TLSI 106B may, for example, respond by decrypting the encrypted payload of the packet 315A and providing it back to the transport layer security switch module 210. In some embodiments, the security gateway 102 could perform certain security checks upon the decrypted payload, etc., before the transport layer security switch module 210 causes the payload to be sent on to the server application 108A as packet 315B at circle '2' (e.g., as a plaintext payload or as an encrypted payload—via use of API calls 302 to the second TLSI 106B—over server TCP connections 306). Note that, in this example, the source IP address and source port of the packet 315B are the same as that of the original packet 315A received from the client end station 104A—thus, the security gateway 102 may spoof this IP address and, upon initializing a server TCP connection 306 to be used in conjunction with the client TCP connection 304, use the same source port (at the security gateway 102) as the source port of the received packet 315A (e.g., port 272).

Next, the server application 108A may transmit a packet 320A over a server TCP connection 306 back destined to the first client end station 104A, but is actually terminated at the security gateway 102. Again, the transport layer security switch module 210 can generate a key to be used to identify the associated TLSI, although in this case the "source" and "destination" IP address and port values can be switched during this key construction (e.g., the source IP address "1.1.1.1" of packet 320A can be used as the destination IP address part of the key, etc.). Thereafter, the processing occurs similar to that for the first received packet 315A but in reverse, and thus, the packet 320B can be formed and sent back at circle '4' to the recipient first client end station 104A.

As mentioned above, not every packet that is part of a connection needs to be processed using the multiple TLSIs 106. For example, TCP handshake packets may be processed only by the transport layer security switch module 210, as in some embodiments the multiple TLSIs 106 only perform transport layer security protocol functions that occur after a TCP connection exists (i.e., after a TCP handshake). However, as described earlier herein, the protection module 110 may be configured to create an entry in the implementation map 212 (i.e., associate a TLSI with the connection) during the TCP handshake process, before the TLSI is even utilized.

For another example we turn to FIG. 4, which is a block diagram illustrating the utilization of multiple TLSIs via direct library calls by a transport layer security switch module of a security gateway configured as a reverse proxy according to some embodiments. In contrast to FIG. 3, in this depicted exemplary embodiment the security gateway 102 is configured as a reverse proxy. A reverse proxy is a type of proxy that retrieves resources on behalf of a client from one or more servers. These resources are then returned to the client as though they originated from the proxy server itself. However, reverse proxies are not "transparent," as clients send requests to an IP address 410 of the reverse proxy. For example, in some scenarios a Domain Name Server (DNS) entry for the origin server (i.e., the origin server's advertised hostname) can be configured so it resolves to the reverse proxy's IP address 410.

In this example, the implementation map 212 includes, in addition to an implementation identifier 222, two different connection identifiers for each entry: a client-gateway connection ID 402 and a gateway-server connection ID 404. Thus, upon receipt of a packet 415A at circle '1', a key can be generated to perform a lookup against the client-gateway connection IDs 402 to identify the associated TLSI, and thereafter packet 415B at circle '2' will be sent on to the server application 108A. This packet 415B can utilize the destination address of the received packet 415A (e.g., "2.2.2.2") as the source IP address, and the IP address 310A of the first server application 108A (e.g., "1.1.1.1") as the destination address.

The same set of operations may occur for traffic originated by the first server application 108A that is indirectly destined to the first client end station 104A, although the implementation map 212 lookup may occur using the key to index the gateway-server connection IDs 404 instead of the client-gateway connection IDs.

Figure 5:
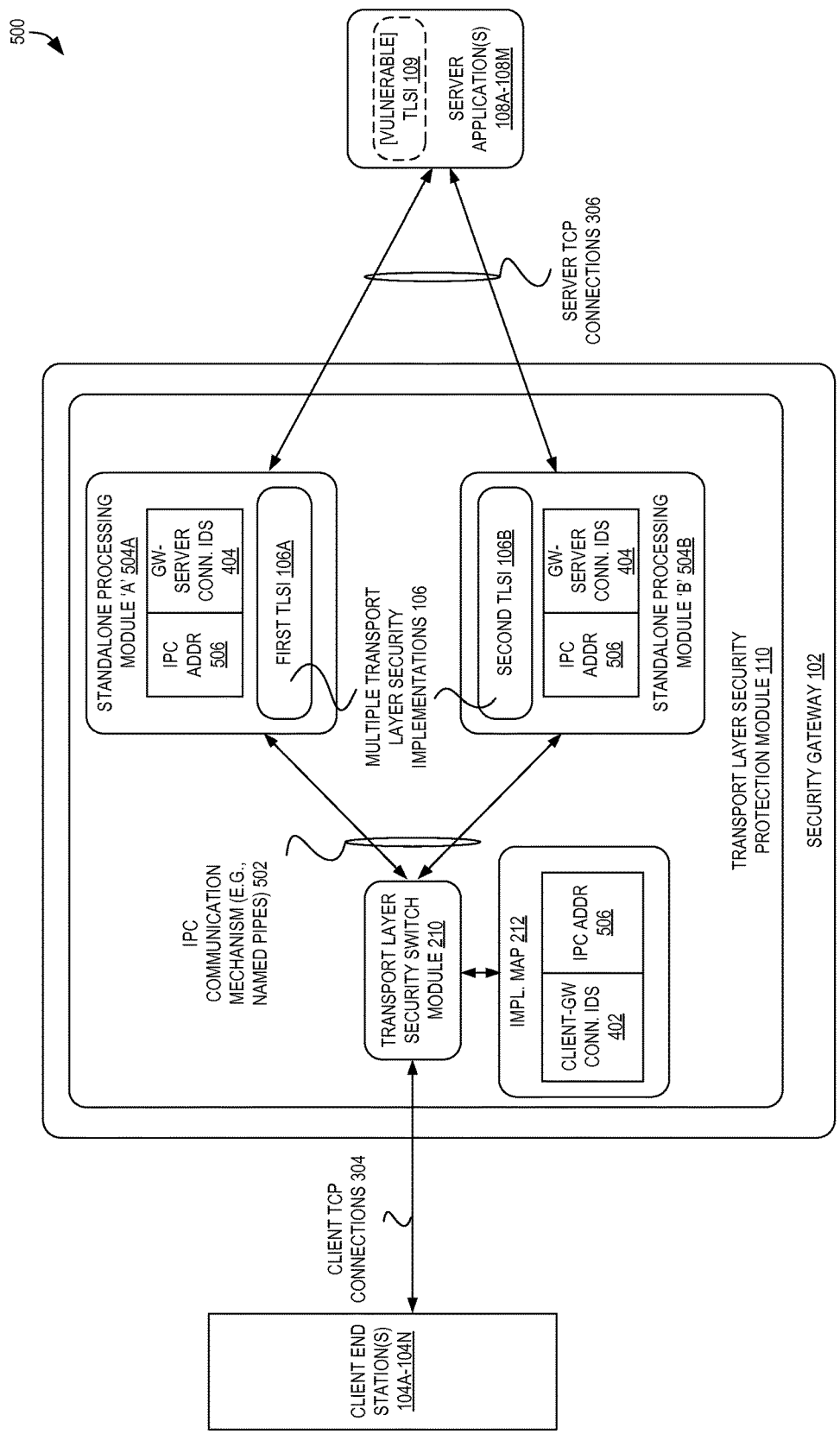
FIG. 5 is a block diagram illustrating the utilization of multiple TLSIs via inter-process communication techniques within a security gateway according to some embodiments.

Although these embodiments of FIGS. 3 and 4 utilize the multiple TLSIs 106 via API calls 302, other embodiments can utilize the multiple TLSIs 106 in different ways. For example, FIG. 5 is a block diagram illustrating the utilization of multiple TLSIs via inter-process communication (IPC) techniques within a security gateway according to some embodiments.

In this depicted embodiment, the transport layer security switch module 210 utilizes the multiple TLSIs 106 using an IPC communication mechanism 502 such as named pipes, shared memory, etc. A named pipe is an extension to the traditional pipe concept on Unix and Unix-like systems. In contrast to a traditional pipe that is "unnamed" because it exists anonymously and persists only for as long as the process is running, a named pipe is system-persistent and exists beyond the life of the process. Processes generally attach to the named pipes (which usually appear/act as a file) to perform IPC.

Thus, in this example, the transport layer security switch module 210 can provide packets (or packet payloads) using an IPC communication mechanism 502 to standalone processing modules 504. Each standalone processing module (504A, 504B, etc.) can implement a full communications stack (or just a transport layer security protocol library) and thus, include and utilize its own TLSI.

In such embodiments, different maps may be used in different configurations (and by different modules). In one embodiment, upon receipt of a packet from a client end station 104A, the transport layer security switch module 210 can construct a key and perform a lookup in the implementation map 212, which may include client-gateway connection IDs 402 and implementation identifiers 222 (e.g., IPC addresses 506). Accordingly, the transport layer security switch module 210 can, for data received from client end stations 104A-104N, construct a key to perform a lookup against the client-gateway connection IDs 402, and pass the packet over the appropriate IPC communication mechanism 502 (selected based upon the lookup result) to the appropriate standalone processing module 504.

The standalone processing module 504 can then perform all network-related processing and transmit a packet over a server TCP connection 306 selected based upon performing a lookup using the IPC address 506 at which the packet was received. Similar operations can occur in reverse to provide for return traffic back from the server application(s) 108A-108M toward the client end stations 104A-104N.

Figure 6:
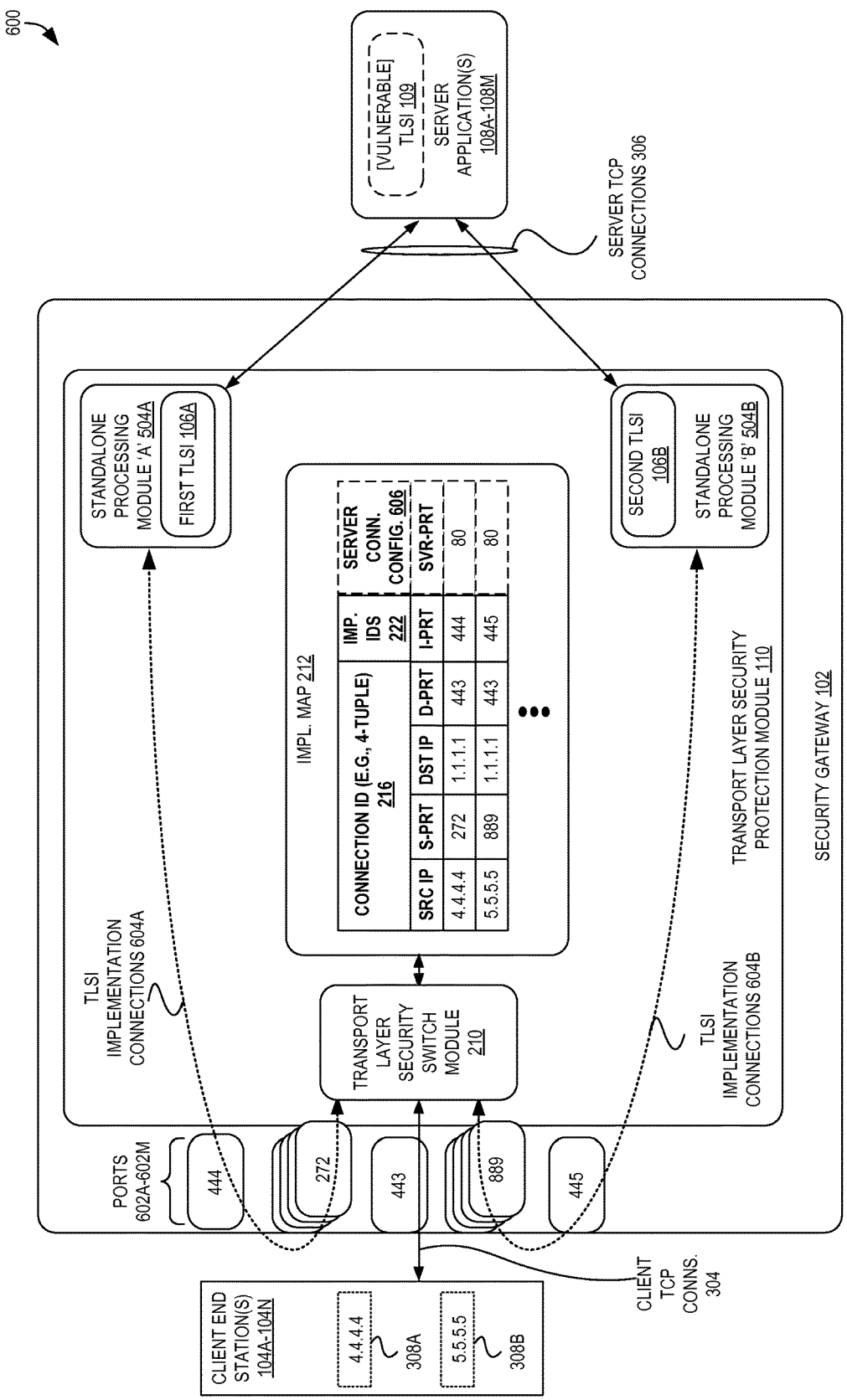
FIG. 6 is a block diagram illustrating the utilization of multiple TLSIs through network connections using different ports according to some embodiments.

Additional ways to utilize the multiple TLSIs 106 are disclosed with regard to FIG. 6, which is a block diagram illustrating a system 600 utilizing multiple TLSIs through network connections using different ports according to some embodiments. Similar to the embodiment disclosed in FIG. 5, this embodiment also includes standalone processing modules 504. However, instead of using IPC mechanisms, the transport layer security switch module 210 and the standalone processing modules 504 can communicate using different ports 602A-602M. Thus, the transport layer security switch module 210 and the standalone processing modules 504 may execute at a same computing device, and create additional TLSI implementation connections 604A-604B (using these ports) to communicate.

For example, the client end stations 104A-104N may send traffic toward the server application(s) 108A-108M using a destination port of "443", which is a standard port reserved for HTTPS traffic. Upon receipt of this traffic, the transport layer security switch module 210 can construct a key (e.g., using the 4-tuple) to lookup an implementation identifier 222 of a port that can be used to reach the proper TLSI. Using this port, the transport layer security switch module 210 can identify one of the TLSI implementation connections 604 to be used to provide the packet (or packet payload) to the selected standalone processing module 504.

In some embodiments, the ports 602A-602M used for these TLSI implementation connections 604A-604B can be the same ports as the source ports used by the involved client end stations 104A-104N. For example, the first entry of the implementation map 212 indicates that the client end station at IP address "4.4.4.4" used source port "272", and thus, the port 602 used to reach the first standalone processing module 504A (including the first TLSI 106A) may be the same port "272". However, in other embodiments the same port numbers are not used.

Additionally, in some embodiments the implementation map 212 may further include a server connection configuration values 606, which can be passed on to the standalone processing modules 504 for use when transmitting data to the server application(s) 108A-108M. For example, the depicted server connection configuration values 606 include a server port number of "80", which is the destination port that should be used for the corresponding server TCP connection 306. Notably, port 80 is utilized for regular ("plaintext") HTTP traffic, and thus, this can indicate that the standalone processing module 504A does not utilize the first TLSI 106A for the gateway-server connection, although it typically is used for processing the client-gateway connection traffic.

Figure 7:
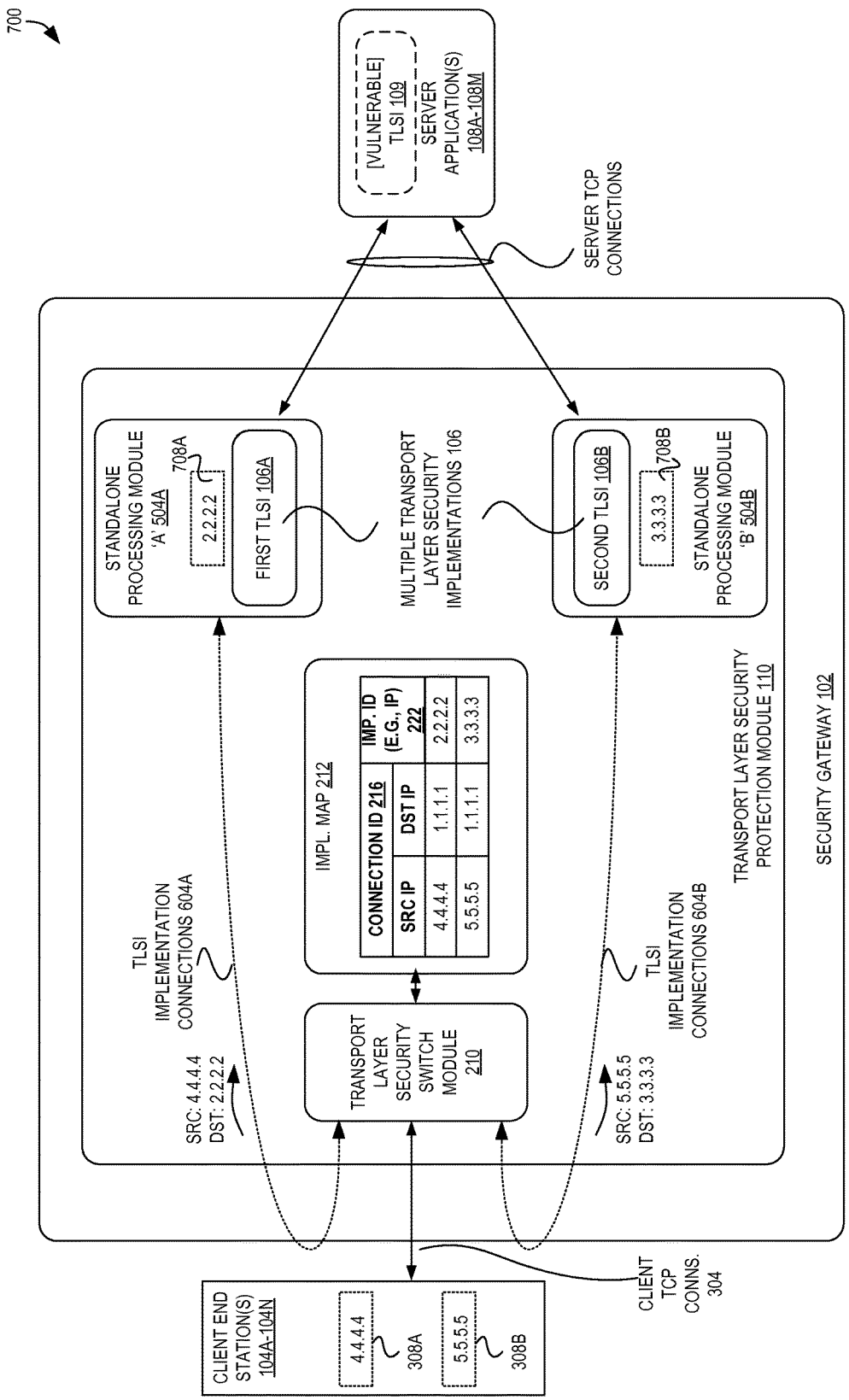
FIG. 7 is a block diagram illustrating the utilization of multiple TLSIs through additional network connections using different network addresses according to some embodiments.

As yet one more example of an additional way to utilize the multiple TLSIs 106, FIG. 7 presents a block diagram illustrating a system 700 utilizing multiple TLSIs through additional network connections using different network addresses according to some embodiments. In this illustrated example, each of the standalone processing modules 504 utilizes its own IP address (708A, 708B) and thus, the transport layer security switch module 210 can provide packets received from the client end stations 104A-104N to the standalone processing modules 504 via use of these IP addresses.

Thus, in this example the implementation map 212 can be simplified to include connection IDs with only a source IP address (of the sending client end station 104) and a destination IP address of the intended recipient server application 108. Additionally, in this embodiment, the implementation identifier 222 can be an IP address of the associated standalone processing module 504, which can be used to identify the TLSI implementation connection over which to send the packet (or packet payload).

Having explored some TLSI utilization techniques, we now turn to FIGS. 8A, 8B, and 8C, which explore techniques for disabling TLSIs. FIG. 8A is a block diagram illustrating a transport layer security protection module operating in a graceful TLSI disablement mode 800 according to some embodiments. In this graceful mode 800, upon a disablement of a TLSI, existing connections utilizing that TLSI are allowed to continue use of the now-disabled TLSI (at least for a period of time). Accordingly, after the second TLSI is disabled (as reflected by the second entry of the available implementation options table 208), traffic of the second implementation map 212 entry can continue using the second TLSI 106B (see circle '2') until the connection is normally terminated (e.g., by one of the client or server), or in some embodiments, until a timeout is reached and then the connection may be dropped/terminated.

In contrast, FIG. 8B is a block diagram illustrating a transport layer security protection module operating in a brutal TLSI disablement mode 850 according to some embodiments. In this brutal mode 850, upon a disablement of a TLSI, existing connections utilizing that TLSI are immediately dropped/terminated, which can include dropping the packets and/or sending a TCP RST (or "reset") packet to the source and/or destination. Accordingly, after the second TLSI is disabled (as reflected by the second entry of the available implementation options table 208), traffic of the second implementation map 212 entry is dropped, and thus the connection will terminate.

Moreover, FIG. 8C is a block diagram illustrating TLSI selection for a new connection after the connection termination and TLSI disablement depicted by FIG. 8A or FIG. 8B according to some embodiments.

With regard to FIG. 8A, at some point in time after the example connection to the second TLSI is terminated 805, a future connection with the same connection identifier (e.g., a same source IP address and same source port, as one example) will use a non-disabled TLSI 875. Accordingly, as reflected by both circles '1' and '2' in FIG. 8C, all of the traffic will utilize the first TLSI 106A.

Similarly, with regard to FIG. 8B, at some point in time after the example connection to the second TLSI is terminated 855, a future connection with the same connection identifier (e.g., a same source IP address and same source port, as one example) will use a non-disabled TLSI 875. Accordingly, as reflected by both circles '1' and '2' in FIG. 8C, all of the traffic will utilize the first TLSI 106A.

On a related note, the entries of the implementation map 212 may be removed (or marked as invalid) upon a purposeful dropping/termination of a connection. Moreover, in some embodiments, the protection module 110 can watch for one or more packets indicating a "natural" closing of the connection (e.g., observing one "close notify" message, or observing two "close notify" messages), and may remove the corresponding entry thereafter. Additionally, in some embodiments the protection module 110 can implement a timeout for the entries and remove the entry upon its expiry.

Figure 9:
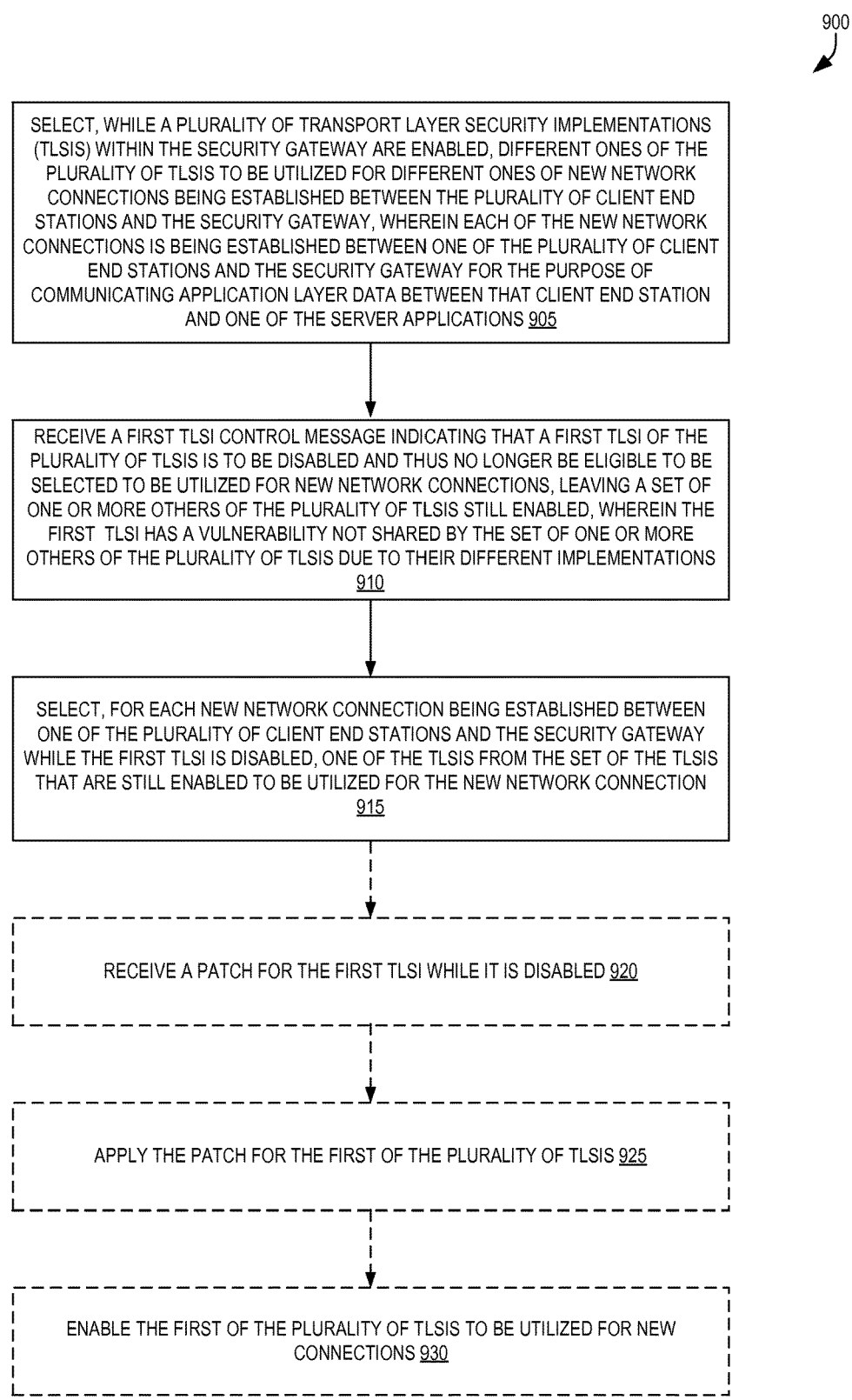
FIG. 9 is a flow diagram illustrating operations in a security gateway for protecting server applications from transport layer security implementation vulnerabilities according to some embodiments.

FIG. 9 is a flow diagram illustrating operations of a flow 900 in a security gateway for protecting server applications from transport layer security implementation vulnerabilities according to some embodiments. The operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The operations of this flow 900 can, in some embodiments, be performed by the security gateway 102 of the other Figures. At block 905, the flow 900 includes selecting, while a plurality of TLSIs within the security gateway are enabled, different ones of the plurality of TLSIs to be utilized for different ones of new network connections being established between the plurality of client end stations and the security gateway. Each of the new network connections is being established between one of the plurality of client end stations and the security gateway for the purpose of communicating application layer data between that client end station and one of the server applications.

At block 910, the flow 900 further includes receiving a first TLSI control message indicating that a first TLSI of the plurality of TLSIs is to be disabled and thus no longer be eligible to be selected to be utilized for new network connections, leaving a set of one or more others of the plurality of TLSIs still enabled. The first TLSI has a vulnerability not shared by the set of one or more others of the plurality of TLSIs due to their different implementations.

At block 915, the flow 900 further includes selecting, for each new network connection being established between one of the plurality of client end stations and the security gateway while the first TLSI is disabled, one of the TLSIs from the set of the TLSIs that are still enabled to be utilized for the new network connection.

Optionally, the flow 900 further includes receiving a patch for the first TLSI while it is disabled (block 920), applying the patch for the first of the plurality of TLSIs (block 925), and enabling the first of the plurality of TLSIs to be utilized for new connections (block 930).

Figure 10:
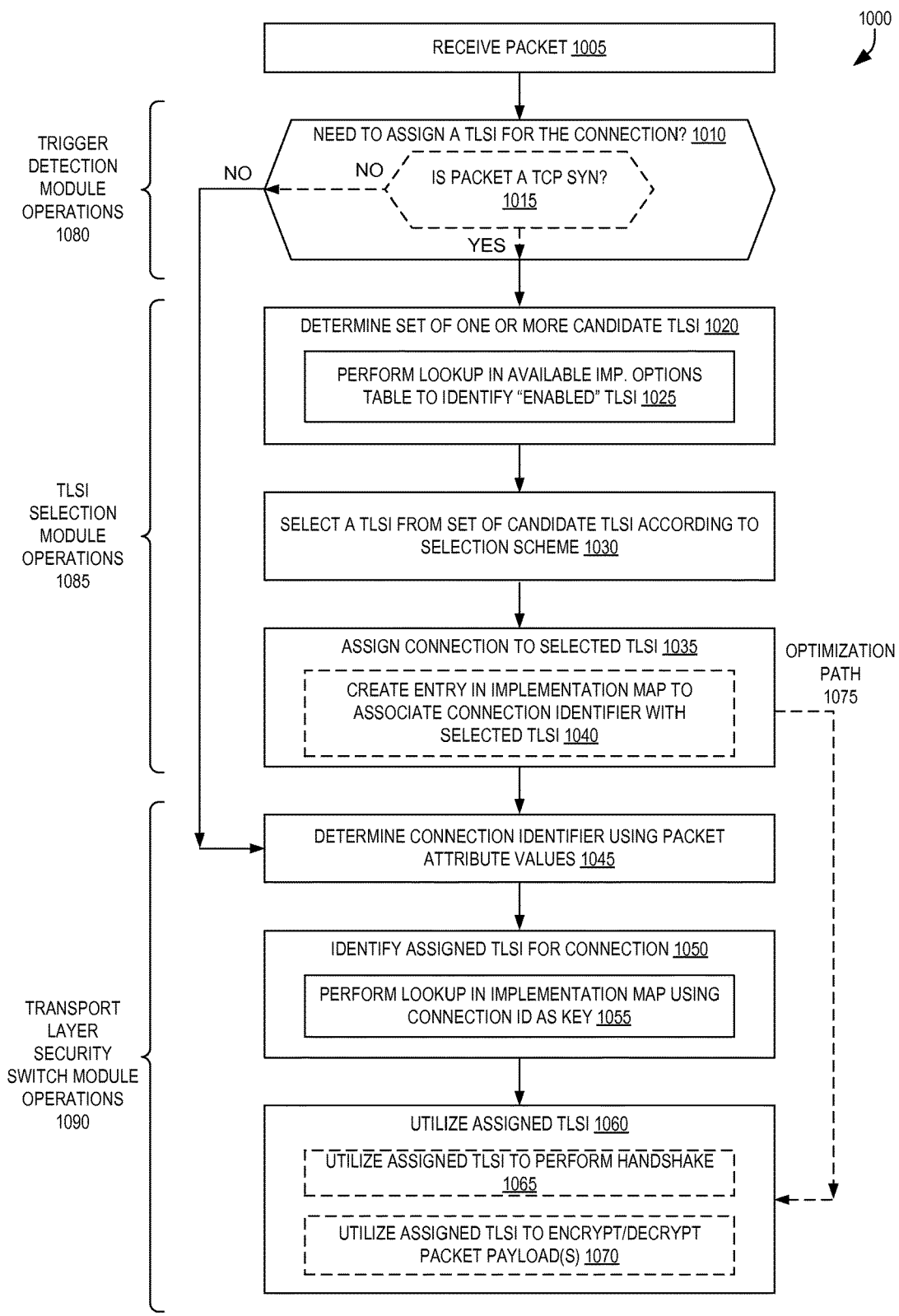
FIG. 10 is a flow diagram illustrating per-packet operations of different modules of a security gateway for protecting server applications from transport layer security implementation vulnerabilities according to some embodiments.

FIG. 10 is a flow diagram illustrating per-packet operations of a flow 1000 performed by different modules of a security gateway for protecting server applications from transport layer security implementation vulnerabilities according to some embodiments.

At block 1005, a packet is received and at decision block 1010, it is determined whether there is a need to assign a TLSI to be utilized for the connection associated with the packet. This can include block 1015, where it is determined whether the packet is a TCP SYN (or "synchronize") packet, although in other embodiments other determinations are possible. If there is a need to assign a TLSI for the connection, the flow 1000 continues to block 1020; otherwise, the flow 1000 continues to block 1045.

However, at block 1020, the flow 1000 includes determining a set of one or more candidate TLSIs that could be selected for the connection. Block 1020 can include, at block 1025, performing a lookup in an available implementation options table 208 to identify the enabled TLSIs.

At block 1030, a TLSI is selected from the set of candidate TLSIs according to a selection scheme. In some embodiments, the selection scheme is deterministic, but in other embodiments it is not.

At block 1035, the flow 1000 further includes assigning the connection to the selected TLSI, which can include at block 1040 creating an entry in implementation map to associate a connection identifier for the connection with the selected TLSI.

Because the selected TLSI is known for the connection, in some embodiments, an optimization path 1075 includes proceeding directly to block 1060, where the assigned TLSI is utilized. Block 1060 can include block 1065, where the assigned TLSI is utilized to perform a handshake, and/or can include block 1070, where the assigned TLSI is utilized to encrypt/decrypt packet payloads.

Assuming the optimization path 1075 was not taken or that block 1010 resulted in a determination that a TLSI need not be assigned to the connection, the flow 1000 includes block 1045, where a connection identifier is determined using packet attribute values (e.g., network attribute values). The flow 1000 then includes, at block 1050, identifying the assigned TLSI for the connection, which can include performing a lookup in the implementation map using the connection identifier as a key at block 1055. The flow 1000 can then proceed with block 1060 and utilizing the assigned TLSI.

In some embodiments, block 1010 is performed by the trigger detection module 202, whereas blocks 1020, 1030, and 1035 are performed by the TLSI selection module 206, and blocks 1045, 1050, and 1060 are performed by the transport layer security switch module 210.

Exemplary Deployment Environments

The components described herein can be deployed in various configurations for various purposes. FIG. 11 is a block diagram illustrating an exemplary deployment 1100 of a security gateway 102 including a transport layer security protection module 110 according to some embodiments.

Specifically, FIG. 11 illustrates a security gateway 102 coupled between a data center 1120 and client end stations 104A-104N. Thus, access to the data center 1120 (and/or server applications 108A-108M) can be thought of as being "protected" by the security gateway 102, as most (or all) desired interactions with the server applications 108A-108M will flow through the security gateway 102.

Security gateways—such as firewalls, database firewalls, file system firewalls, and web application firewalls (WAFs)—are network security systems that protect software applications (e.g., server applications 108) executing on electronic devices (e.g., server end stations 1110) within a network by controlling the flow of network traffic passing through the security gateway. By analyzing packets flowing through the security gateway and determining whether those packets should be allowed to continue traveling through the network, the security gateway can prevent malicious traffic from reaching a protected server, modify the malicious traffic, and/or create an alert to trigger another responsive event or notify a user of the detection of the malicious traffic.

In some embodiments, the security gateway 102 is communicatively coupled between the client end stations 104 and the server end stations 1110, such that all traffic (or a defined subset of traffic) destined to the server end stations 1110 is first passed through (or made available to) the security gateway 102 for analysis. In some embodiments, part of the analysis is performed by the security gateway 102 based upon one or more configured security rules 1150.

In some embodiments, the security gateway 102 executes as a reverse proxy or transparent proxy 1130 coupled with a switch 1145; but in other embodiments, the security gateway 102 can operate as part of server end stations 1110 (for example, as a software module), or can be implemented using or another type of electronic device and can be software, hardware, or a combination of both.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Security gateways are sometimes deployed as transparent inline bridges, routers, or transparent proxies. A security gateway deployed as a transparent inline bridge, transparent router, or transparent proxy is placed inline between clients and servers and is "transparent" to both the clients and servers (the clients and the servers are not aware of the IP address of the security gateway, and thus the security gateway is not an apparent endpoint). Thus, packets sent between the clients and the servers will pass through the security gateway (e.g., arrive at the security gateway, be analyzed by the security gateway, and may be blocked or forwarded on to the server when the packets are deemed acceptable by the security gateway).

Additionally, security gateways can also be deployed as a reverse proxy or non-inline sniffer (which may be coupled to a switch 1145 or other network device forwarding network traffic between the client end stations 104 and the server end stations 1110).

In FIG. 11, a set of one or more server end stations 1110 execute or otherwise implement the one or more server applications 108, which can include a database server, a file server, a web application server, a mail server, print server, gaming server, application server, etc. A web application server is system software (running on top of an operating system) executed by server hardware (e.g., server end stations 1110) upon which web applications run. Web application servers may include a web server (e.g. Apache, Microsoft® Internet Information Server (IIS), nginx, lighttpd) that delivers web pages (or other content) upon the request of HTTP clients (i.e., software executing on a client end station) using the HTTP protocol. Web application servers can also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers 916 and are written in a language the web application server supports. Web applications are typically designed to interact with HTTP clients by dynamically generating HyperText Markup Language (HTML) and other content responsive to HTTP request messages sent by those HTTP clients. HTTP clients (e.g., non-illustrated software of any of client end stations 104) typically interact with web applications by transmitting HTTP request messages to web application servers, which execute portions of web applications and return web application data in the form of HTTP response messages back to the HTTP clients, where the web application data can be rendered using a web browser. Thus, HTTP functions as a request-response protocol in a client-server computing model, where the web application servers typically act as the "server" and the HTTP clients typically act as the "client."

HTTP Resources are identified and located on a network by Uniform Resource Identifiers (URIs)—or, more specifically, Uniform Resource Locators (URLs)—using the HTTP or Hypertext Transfer Protocol over TLS/SSL (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today. A new version of the HTTP protocol, HTTP/2, is based upon the SPDY protocol and improves how transmitted data is framed and transported between clients and servers.

Database servers are computer programs that provide database services to other computer programs or computers, typically adhering to the client-server model of communication. Many web applications utilize database servers (e.g., relational databases such as PostgreSQL, MySQL, and Oracle, and non-relational databases, also known as NoSQL databases, such as MongoDB, Riak, CouchDB, Apache Cassandra, and HBase) to store information received from HTTP clients and/or information to be displayed to HTTP clients. However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column Thus, in some instances a database server can receive a SQL query from a client (directly from a client process or client end station using a database protocol, or indirectly via a web application server that a client is interacting with), execute the SQL query using data stored in the set of one or more database tables of one or more of the databases, and may potentially return a result (e.g., an indication of success, a value, one or more tuples, etc.).

A file server is system software (e.g., running on top of an operating system, or as part of an operating system itself) typically executed by one or more server end stations 1110 (each coupled to or including one or more storage devices) that allows applications or client end stations access to a file-system and/or files, typically allowing for the opening of files, reading of files, writing to files, and/or closing of files over a network. Further, while some file servers provide file-level access to storage, other file servers may provide block-level access to storage. File servers typically operate using any number of remote file-system access protocols, which allow client processes to access and/or manipulate remote files from across the Internet or within a same enterprise network (e.g., a corporate Intranet). Examples of remote file-system access protocols include, but are not limited to, Network File System (NFS), WebNFS, Server Message Block (SMB)/Common Internet File System (CIFS), File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint (TM), which is a web application platform providing content management and document and file management.

A mail server (or messaging server, message transfer agent, mail relay, etc.) is system software (running on top of an operating system) executed by server hardware (e.g., server end stations 1110) that can transfer electronic messages (e.g., electronic mail) from one computing device to another using a client-server application architecture. Many mail servers may implement and utilize the Simple Mail Transfer Protocol (SMTP), and may utilize the Post Office Protocol (POP3) and/or the Internet Message Access Protocol (IMAP), although many proprietary systems also exist. Many mail servers also offer a web interface (e.g., as a web application) for reading and sending email.

Additionally, FIG. 11 illustrates the a management server end station 1160 as including the management server 112 including the vulnerability manager 114 and server patch management module 116. The management server 112 may also be configured to update, add, or remove security rules 1150 utilized by the security gateway 102 to perform security-related tasks.

While the flow diagrams in the figures show a particular order of operations performed by certain embodiments, it should be understood that such order is exemplary (e.g., alternative embodiments may perform the operations in a different order, combine certain operations, overlap certain operations, etc.). One having ordinary skill in the art would recognize that variations can be made to the flow diagrams without departing from the broader spirit and scope of the invention.

Similarly, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a security gateway for protecting one or more server applications from transport layer security implementation vulnerabilities, wherein the security gateway is communicatively coupled between a plurality of client end stations and the one or more server applications to communicate application layer data between them, and wherein the security gateway is configured to communicate the application layer data with the plurality of client end stations through network connections that terminate at the security gateway, the method comprising:
    selecting, at the security gateway while a plurality of transport layer security implementations (TLSIs) within the security gateway are enabled, different ones of the plurality of TLSIs to be utilized for different ones of new network connections being established between the plurality of client end stations and the security gateway, wherein each of the new network connections is being established between one of the plurality of client end stations and the security gateway for the purpose of communicating application layer data between that client end station and one of the server applications;
    receiving, at the security gateway, a first TLSI control message indicating that a first TLSI of the plurality of TLSIs is to be disabled and thus no longer be eligible to be selected to be utilized for new network connections, leaving a set of one or more others of the plurality of TLSIs still enabled, wherein the first TLSI has a vulnerability not shared by the set of one or more others of the plurality of TLSIs due to their different implementations;
    selecting, at the security gateway, for each new network connection being established between one of the plurality of client end stations and the security gateway while the first TLSI is disabled, one of the TLSIs from the set of the TLSIs that are still enabled to be utilized for the new network connection;
    receiving, at the security gateway, a patch for the first TLSI while it is disabled; and
    enabling, at the security gateway after the first TLSI has been disabled and after the patch has been applied, the first TLSI.

2. The method of claim 1, wherein:
    the first TLSI control message includes an enablement condition; and
    the enabling of the first TLSI occurs responsive to determining that the enablement condition has been met.

3. The method of claim 2, wherein:
    the enablement condition comprises a software version identifier of the first TLSI; and
    the determining that the enablement condition has been met comprises determining, after the patch has been applied, that a current version identifier of the first TLSI is greater than or equal to the software version identifier of the enablement condition.

4. The method of claim 1, wherein:
    before the receiving of the first TLSI control message indicating that the first TLSI is to be disabled, the selecting includes selecting the first TLSI for a first of the new network connections that is with a first client end station of the plurality of client end stations; and
    the method further comprises after the receipt of the first TLSI control message and after the first TLSI is disabled, continuing to utilize the first TLSI for the first new network connection.

5. The method of claim 4, wherein the selecting includes:
    selecting, while the first TLSI is disabled, a second TLSI of the set of the TLSIs that are still enabled for a second of the new network connections that is with the first client end station.

6. The method of claim 1, wherein:
    before the receipt of the first TLSI control message indicating that the first TLSI is to be disabled, the selecting includes selecting the first TLSI for a first of the new network connections that is with a first client end station of the plurality of client end stations; and
    wherein the method further comprises after the receipt of the first TLSI control message, causing the first new network connection to be terminated.

7. The method of claim 1, wherein the selecting of the different ones of the plurality of TLSIs to be utilized for the different ones of the new connections is based upon weights assigned to the plurality of TLSIs.

8. The method of claim 1, wherein the selecting of the different ones of the plurality of TLSIs to be utilized for the different ones of the new connections is based upon network attributes from packets of the new connections.

9. The method of claim 1, wherein the security gateway acts as a transparent proxy between the plurality of client end stations and the one or more server applications.

10. The method of claim 1, wherein the security gateway acts as a reverse proxy between the plurality of client end stations and the one or more server applications.

11. The method of claim 1, further comprising:
    issuing, for packets received over the new network connections from the plurality of client end stations, Application Programming Interface (API) calls to the plurality of TLSIs according to the selections.

12. The method of claim 1, wherein each of the plurality of TLSIs is utilized to implement a transport layer security protocol by a corresponding standalone processing module that implements a transport layer protocol, and wherein the method further comprises:
    providing, for packets received over the new network connections from the plurality of client end stations, the packets via an Inter-Process Communication (IPC) communication mechanism to the standalone processing modules according to the selections.

13. The method of claim 1, wherein each of the plurality of TLSIs is utilized to implement a transport layer security protocol by a corresponding standalone processing module that implements a transport layer protocol, wherein each of the standalone processing modules is bound to a different port, and wherein the method further comprises:
    modifying transport layer destination port header field values of packets received over the new network connections from the plurality of client end stations to reference the different ports according to the selections; and sending the modified packets to the plurality of standalone processing modules according to the modified different ports.

14. The method of claim 1, wherein each of the plurality of TLSIs is utilized to implement a transport layer security protocol by a corresponding standalone processing module that implements a transport layer protocol, wherein each of the standalone processing modules is bound to a different Internet Protocol (IP) address, and wherein the method further comprises:
   modifying Internet layer destination address header field values of packets received over the new network connections from the plurality of client end stations to reference the different IP addresses according to the selections; and
   sending the modified packets to the plurality of standalone processing modules according to the different IP addresses.

15. A non-transitory computer readable medium storing instructions which, when executed by one or more processors of an electronic device, cause the electronic device to implement a security gateway that protects one or more server applications from transport layer security implementation vulnerabilities by performing operations, wherein the security gateway is to be communicatively coupled between a plurality of client end stations and the one or more server applications to communicate application layer data between them, and wherein the security gateway is configured to communicate the application layer data with the plurality of client end stations through network connections that terminate at the security gateway, wherein the operations include:
   selecting, while a plurality of transport layer security implementations (TLSIs) within the security gateway are enabled, different ones of the plurality of TLSIs to be utilized for different ones of new network connections being established between the plurality of client end stations and the security gateway, wherein each of the new network connections is being established between one of the plurality of client end stations and the security gateway for the purpose of communicating application layer data between that client end station and one of the server applications;
   receiving a first TLSI control message indicating that a first TLSI of the plurality of TLSIs is to be disabled and thus no longer be eligible to be selected to be utilized for new network connections, leaving a set of one or more others of the plurality of TLSIs still enabled, wherein the first TLSI has a vulnerability not shared by the set of one or more others of the plurality of TLSIs due to their different implementations;
   selecting for each new network connection being established between one of the plurality of client end stations and the security gateway while the first TLSI is disabled, one of the TLSIs from the set of the TLSIs that are still enabled to be utilized for the new network connection;
   receiving, at the security gateway, a patch for the first TLSI while it is disabled; and
   enabling, at the security gateway after the first TLSI has been disabled and after the patch has, been applied, the first TLSI.

16. The non-transitory computer readable medium of claim 15, wherein:
   the first TLSI control message includes an enablement condition; and
   the enabling of the first TLSI occurs responsive to determining that the enablement condition has been met.

17. The non-transitory computer readable medium of claim 16, wherein:
   the enablement condition comprises a software version identifier of the first TLSI; and
   the determining that the enablement condition has been met comprises determining, after the patch has been applied, that a current version identifier of the first TLSI is greater than or equal to the software version identifier of the enablement condition.

18. The non-transitory computer readable medium of claim 15, wherein:
   before the receiving of the first TLSI control message indicating that the first TLSI is to be disabled, the selecting includes selecting the first TLSI for a first of the new network connections that is with a first client end station of the plurality of client end stations; and
   the operations further include after the receipt of the first TLSI control message and after the first TLSI is disabled, continuing to utilize the first TLSI for the first new network connection.

19. The non-transitory computer readable medium of claim 18, wherein the selecting includes:
   selecting, while the first TLSI is disabled, a second TLSI of the set of the TLSIs that are still enabled for a second of the new network connections that is with the first client end station.

20. The non-transitory computer readable medium of claim 15, wherein:
   before the receipt of the first TLSI control message indicating that the first TLSI is to be disabled, the selecting includes selecting the first TLSI for a first of the new network connections that is with a first client end station of the plurality of client end stations; and
   wherein the operations further include after the receipt of the first TLSI control message, causing the first new network connection to be terminated.

21. The non-transitory computer readable medium of claim 15, wherein the selecting of the different ones of the plurality of TLSIs to be utilized for the different ones of the new connections is based upon weights assigned to the plurality of TLSIs.

22. The non-transitory computer readable medium of claim 15, wherein the selecting of the different ones of the plurality of TLSIs to be utilized for the different ones of the new connections is based upon network attributes from packets of the new connections.

23. The non-transitory computer readable medium of claim 15, wherein the security gateway acts as a transparent proxy between the plurality of client end stations and the one or more server applications.

24. The non-transitory computer readable medium of claim 15, wherein the security gateway acts as a reverse proxy between the plurality of client end stations and the one or more server applications.

25. The non-transitory computer readable medium of claim 15, wherein the operations further comprise:
   issuing, for packets received over the new network connections from the plurality of client end stations, Application Programming Interface (API) calls to the plurality of TLSIs according to the selections.

26. The non-transitory computer readable medium of claim 15, wherein each of the plurality of TLSIs is utilized to implement a transport layer security protocol by a corresponding standalone processing module that implements a transport layer protocol, and wherein the operations further comprise:

providing, for packets received over the new network connections from the plurality of client end stations, the packets via an Inter-Process Communication (IPC) communication mechanism to the standalone processing modules according to the selections.

27. The non-transitory computer readable medium of claim 15, wherein each of the plurality of TLSIs is utilized to implement a transport layer security protocol by a corresponding standalone processing module that implements a transport layer protocol, wherein each of the standalone processing modules is bound to a different port, and wherein the operations further comprise:
modifying transport layer destination port header field values of packets received over the new network connections from the plurality of client end stations to reference the different ports according to the selections; and
sending the modified packets to the plurality of standalone processing modules according to the modified different ports.

28. The non-transitory computer readable medium of claim 15, wherein each of the plurality of TLSIs is utilized to implement a transport layer security protocol by a corresponding standalone processing module that implements a transport layer protocol, wherein each of the standalone processing modules is bound to a different Internet Protocol (IP) address, and wherein the operations further comprise:
modifying Internet layer destination address header field values of packets received over the new network connections from the plurality of client end stations to reference the different IP addresses according to the selections; and
sending the modified packets to the plurality of standalone processing modules according to the different IP addresses.

29. A computing device implementing a security gateway configured to protect one or more server applications from transport layer security implementation vulnerabilities, wherein the security gateway is to be communicatively coupled between a plurality of client end stations and the one or more server applications to communicate application layer data between them, and wherein the security gateway is configured to communicate the application layer data with the plurality of client end stations through network connections that terminate at the security gateway, the computing device comprising:
one or more processors; and
a non-transitory computer readable medium storing instructions which, when executed by the one or more processors, cause the security gateway to perform operations comprising:
selecting, while a plurality of transport layer security implementations (TLSIs) within the security gateway are enabled, different ones of the plurality of TLSIs to be utilized for different ones of new network connections being established between the plurality of client end stations and the security gateway, wherein each of the new network connections is being established between one of the plurality of client end stations and the security gateway for the purpose of communicating application layer data between that client end station and one of the server applications;
receiving a first TLSI control message indicating that a first TLSI of the plurality of TLSIs is to be disabled and thus no longer be eligible to be selected to be utilized for new network connections, leaving a set of one or more others of the plurality of TLSIs still enabled, wherein the first TLSI has a vulnerability not shared by the set of one or more others of the plurality of TLSIs due to their different implementations;
selecting for each new network connection being established between one of the plurality of client end stations and the security gateway while the first TLSI is disabled, one of the TLSIs from the set of the TLSIs that are still enabled to be utilized for the new network connection;
receiving a patch for the first TLSI while it is disabled; and
enabling, after the first TLSI has been disabled and after the patch has been applied, the first TLSI.

30. The computing device of claim 29, wherein:
the first TLSI control message includes an enablement condition; and
the enabling of the first TLSI occurs responsive to determining that the enablement condition has been met.

31. The computing device of claim 30, wherein:
the enablement condition comprises a software version identifier of the first TLSI; and
the determining that the enablement condition has been met comprises determining, after the patch has been applied, that a current version identifier of the first TLSI is greater than or equal to the software version identifier of the enablement condition.

32. The computing device of claim 29, wherein:
before the receiving of the first TLSI control message indicating that the first TLSI is to be disabled, the selecting includes selecting the first TLSI for a first of the new network connections that is with a first client end station of the plurality of client end stations; and
the operations further include after the receipt of the first TLSI control message and after the first TLSI is disabled, continuing to utilize the first TLSI for the first new network connection.

33. The computing device of claim 32, wherein the selecting includes:
selecting, while the first TLSI is disabled, a second TLSI of the set of the TLSIs that are still enabled for a second of the new network connections that is with the first client end station.

34. The computing device of claim 29, wherein:
before the receipt of the first TLSI control message indicating that the first TLSI is to be disabled, the selecting includes selecting the first TLSI for a first of the new network connections that is with a first client end station of the plurality of client end stations; and
wherein the operations further include after the receipt of the first TLSI control message, causing the first new network connection to be terminated.

35. The computing device of claim 29, wherein the selecting of the different ones of the plurality of TLSIs to be utilized for the different ones of the new connections is based upon weights assigned to the plurality of TLSIs.

36. The computing device of claim 29, wherein the selecting of the different ones of the plurality of TLSIs to be utilized for the different ones of the new connections is based upon network attributes from packets of the new connections.

37. The computing device of claim 29, wherein the security gateway is configured to act as a transparent proxy between the plurality of client end stations and the one or more server applications.

38. The computing device of claim 29, wherein the security gateway is configured to act as a reverse proxy between the plurality of client end stations and the one or more server applications.

39. The computing device of claim 29, wherein the operations further comprise:
 issuing, for packets received over the new network connections from the plurality of client end stations, Application Programming Interface (API) calls to the plurality of TLSIs according to the selections.

40. The computing device of claim 29, wherein each of the plurality of TLSIs is utilized to implement a transport layer security protocol by a corresponding standalone processing module that implements a transport layer protocol, and wherein the operations further comprise:
 providing, for packets received over the new network connections from the plurality of client end stations, the packets via an Inter-Process Communication (IPC) communication mechanism to the standalone processing modules according to the selections.

41. The computing device of claim 29, wherein each of the plurality of TLSIs is utilized to implement a transport layer security protocol by a corresponding standalone processing module that implements a transport layer protocol, wherein each of the standalone processing modules is bound to a different port, and wherein the operations further comprise:
 modifying transport layer destination port header field values of packets received over the new network connections from the plurality of client end stations to reference the different ports according to the selections; and
 sending the modified packets to the plurality of standalone processing modules according to the modified different ports.

42. The computing device of claim 29, wherein each of the plurality of TLSIs is utilized to implement a transport layer security protocol by a corresponding standalone processing module that implements a transport layer protocol, wherein each of the standalone processing modules is bound to a different Internet Protocol (IP) address, and wherein the operations further comprise:
 modifying Internet layer destination address header field values of packets received over the new network connections from the plurality of client end stations to reference the different IP addresses according to the selections; and
 sending the modified packets to the plurality of standalone processing modules according to the different IP addresses.

\* \* \* \* \*